US011581691B2

(12) United States Patent
Marshall et al.

(10) Patent No.: US 11,581,691 B2
(45) Date of Patent: Feb. 14, 2023

(54) ALL-OPTICAL, OPTICALLY ADDRESSABLE LIQUID CRYSTAL-BASED LIGHT VALVE EMPLOYING PHOTOSWITCHABLE ALIGNMENT LAYER FOR HIGH-POWER AND/OR LARGE APERTURE LASER APPLICATIONS

(71) Applicant: University of Rochester, Rochester, NY (US)

(72) Inventors: Kenneth L. Marshall, Rochester, NY (US); Stavros G. Demos, Rochester, NY (US); Tanya Kosc, Rochester, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 669 days.

(21) Appl. No.: 16/542,341

(22) Filed: Aug. 16, 2019

(65) Prior Publication Data
US 2021/0048704 A1 Feb. 18, 2021

(51) Int. Cl.
*H01S 3/00* (2006.01)
*C09K 19/00* (2006.01)
*G02F 1/1337* (2006.01)

(52) U.S. Cl.
CPC .......... *H01S 3/0057* (2013.01); *C09K 19/00* (2013.01); *G02F 1/133711* (2013.01); *C09K 2323/02* (2020.08); *G02F 2201/16* (2013.01); *G02F 2203/24* (2013.01); *G02F 2203/26* (2013.01); *H01S 3/0085* (2013.01)

(58) Field of Classification Search
CPC ... C09K 19/00; C09K 2323/02; H01S 3/0057; H01S 3/0085; G02F 1/133711; G02F 2201/16; G02F 2203/24; G02F 2203/26

USPC .......................................................... 430/19
See application file for complete search history.

(56) References Cited

U.S. PATENT DOCUMENTS

| 2017/0219855 A1 | 8/2017 | Demuth et al. |
| 2018/0207722 A1 | 7/2018 | Feldmann et al. |
| 2018/0272613 A1 | 9/2018 | Cieszynski et al. |
| 2021/0046586 A1 | 2/2021 | Marshall et al. |

FOREIGN PATENT DOCUMENTS

WO      2022010977      1/2022

OTHER PUBLICATIONS

Bahk et al., A High-Resolution, Adaptive Beam-Shaping System for High-Power Lasers, Laboratory for Laser Energetics, Optics Express, vol. 18, No. 9, Apr. 26, 2010, pp. 9151-9163.
Dorrer et al., High-Damage-Threshold Static Laser Beam Shaping Using Optically Patterned Liquid-crystal Devices, Optics Letters, vol. 36, No. 20, Oct. 15, 2011, pp. 4035-4037.
(Continued)

*Primary Examiner* — Ruiyun Zhang
(74) *Attorney, Agent, or Firm* — Kilpatrick Townsend & Stockton LLP

(57) ABSTRACT

A beam shaping system including an all-optical liquid crystal beam shaper, the beam shaper including a photoswitchable alignment material including at least one of a PESI-F, SPMA:MMA 1:5, SPMA:MMA 1:9, ora SOMA:SOMA-p:MMA 1:1:6 material, at least some of the liquid crystals of the beam shaper including at least one of a phenylcyclohexane, cyclo-cyclohexane, or a perfluorinated material.

30 Claims, 18 Drawing Sheets
(14 of 18 Drawing Sheet(s) Filed in Color)

(56) References Cited

OTHER PUBLICATIONS

Haynam et al., National Ignition Facility Laser Performance Status, Applied Optics, vol. 46, No. 16, Jun. 1, 2007, pp. 3276-3303.

Heebner, A Programmable Beam Shaping System for Tailoring the Profile of High Fluence Laser Beams, Proceedings of Society of Photo-Optical Instrumentation Engineers, vol. 7842, Nov. 22, 2010, 7 pages.

Heebner et al., Programmable Beam Spatial Shaping System for the National Ignition Facility, Proceedings of Society of Photo-Optical Instrumentation Engineers, vol. 7916, Feb. 4, 2011, 7 pages.

Ichimura, Photoalignment of Liquid-Crystal Systems, Chemical Reviews, vol. 100, No. 5, Jun. 2000, pp. 1847-1873.

Jacobs et al., Liquid Crystal Optics for Laser Systems, Proceedings of Society of Photo-Optical Instrumentation Engineers, vol. 895, Jun. 27, 1988, pp. 120-151.

Jacobs et al., Liquid-crystal Laser Optics: Design, Fabrication, and Performance, Journal of the Optical Society of America B, vol. 5, No. 9, 1988, pp. 1962-1979.

Marshall et al., Laser-Damage-Resistant Photoalignment Layers for High-Peak-Power Liquid Crystal Device Applications, Proceedings of Society of Photo-Optical Instrumentation Engineers, vol. 7050, Aug. 2008, pp. 70500L-1-70500L-10.

Marshall et al., Liquid Crystal Beam-shaping Devices Employing Patterned Photoalignment Layers for High-peak-power Laser Applications, Proceedings of Society of Photo-Optical Instrumentation Engineers, vol. 8114, Sep. 7, 2011, 9 pages.

Marshall et al., Photoaligned Liquid Crystal Devices for High-Peak-Power Laser Applications, Proceedings of Society of Photo-Optical Instrumentation Engineers, vol. 8475, Oct. 15, 2012, 14 pages.

Muravsky et al., Optical Rewritable Liquid-Crystalalignment Technology, Journal of the Society for Information Display, vol. 15, No. 4, Apr. 2007, pp. 267-273.

Nersisyan et al., Improving Vector Vortex Waveplates for Highcontrast Coronagraphy, Optics Express, vol. 21, No. 7, Apr. 8, 2013, pp. 8205-8213.

Schmid et al., Liquid-Crystal Materials for High Peak-Power Laser Applications, Molecular Crystals and Liquid Crystals, vol. 207, 1991, pp. 33-42.

Van Wonterghem et al., Performance of a Prototype for a Large-Aperture Multipass Nd:glass Laser for Inertial Confinement Fusion, Applied Optics, vol. 36, No. 21, Jul. 20, 1997, pp. 4932-4953.

Vernon et al., Generation of Light Scattering States in Cholesteric Liquid Crystals by Optically Controlled Boundary Conditions, Crystals, vol. 3, No. 1, Mar. 18, 2013, pp. 234-247.

Vernon et al., Optically Reconfigurable Reflective/scattering States Enabled with Photosensitive Cholesteric Liquid Crystal Cells, Advanced Optical Materials, vol. 1, No. 1, Jan. 2013, pp. 84-91.

Vernon et al., Photostimulated Control of Laser Transmission Through Photoresponsive Cholesteric Liquid Crystals, Optics Express, vol. 21, No. 2, Jan. 28, 2013, pp. 1645-1655.

Weglowski et al., Poly(Esterimide) Bearing Azobenzene Units as Photoaligning Layer for Liquid Crystals, Optical Materials, vol. 49, Nov. 2015, pp. 224-229.

Application No. PCT/US2021/040626, International Search Report and Written Opinion, dated Jan. 28, 2022, 17 pages.

PCT/US2021/040626, "Invitation to Pay Additional Fees and, Where Applicable, Protest Fee", Dec. 6, 2021, 7 pages.

PESI-F*

ALL-OPTICAL, OPTICALLY ADDRESSABLE LIQUID CRYSTAL-BASED LIGHT VALVE EMPLOYING PHOTOSWITCHABLE ALIGNMENT LAYER FOR HIGH-POWER AND/OR LARGE APERTURE LASER APPLICATIONS

FEDERALLY SPONSORED RESEARCH OR DEVELOPMENT

This invention was made with government support under DE-EE0006033, DE-NA0001944 and DE-NA0003856 awarded by the Department of Energy. The government has certain rights in the invention.

RELATED FIELDS

Liquid crystal beam shaping systems for laser applications.

BACKGROUND

Liquid crystals (LC's) have anisotropic optical properties that make them ideal materials from which to construct either passive or active devices that offer polarization, phase, or intensity control. Though LC's are commonly associated with the display industry, they are useful in a wide variety of other applications, including in various laser systems for spectral and polarization control of the laser beam. For example, LC circular polarizers and wave plates have been key components in the near-infrared portion of the 351-nm, 1-ns, 40-TW OMEGA laser at the Laboratory for Laser Energetics (LLE) for over 30 years. The laser induced damage threshold (LIDT) of the material (or optical component) is a key factor in determining the suitability and performance parameters for most optical materials incorporated in such laser systems. Because the utilization of lasers is continuously expanding into an increasing number of applications, there is a growing need for optical components suitable for higher average power and/or peak intensity systems. As the constituent optical materials and optical components represent a limit (damage threshold) on how much energy they can handle, increasing the power output of laser systems requires an accompanying increase in their clear aperture. An additional growing need is associated with attaining a higher quality spatial distribution of the laser energy within the laser beam profile, including the ability to control the spatial distribution of the beam amplitude and/or phase. Optical devices that can offer this capability, typically referred to generically as "light valves", must be able to withstand the transmitted power of the laser beam while maintaining performance and beam profile characteristics for the application-specific time durations.

Recent work has highlighted the potential of LC electrically-biased optically-addressable light valve (OALV) technology to advance additive manufacturing applications (3D printing) by allowing for a continuously variable beam profile to print entire layers of metal powder simultaneously. Such an approach will expedite the manufacturing process, reduce cost, and improve as built material properties.

SUMMARY

This patent describes examples of all-optical, optically addressable, liquid crystal-based light valves for high-power, large aperture, and other laser applications. These light valves employ specific classes of materials and optical arrangements allowing their use with high average power and/or peak intensity laser applications, such as for laser systems for additive manufacturing and directed energy applications, and for other laser applications. The approach uses an all-optical design (no conductive oxide electrodes, electrical interconnects, etc.) based on unique photoswitchable alignment layers and LC materials.

The photoalignment layers and LC materials used in the devices are exceptionally resistant to damage from high-intensity laser energy and provide the ability to reproducibly write, store, and erase high-resolution optical patterns with minimal loss of resolution and contrast after multiple write/erase cycles. The LC materials incorporated into the device are preferably saturated materials (i.e., those that contain a minimum of carbon-carbon double bonds), even more preferably fully saturated materials. The combination of optical valve design and specific materials/classes of materials described in this patent are advantageous for several reasons:

a) High damage threshold: the photoswitchable alignment materials and saturated LC materials described in this patent provide optimized damage thresholds that nears, meets, or in some cases exceeds that of the conventionally-polished fused silica substrates used in these devices, thus reaching a fundamental upper limit.

b) Low absorption at the operational (laser) frequency: due to the nanometer-scale thickness of the alignment layers, any significant energy deposition to the device by the laser beam would occur only via LC material absorbance. As discussed below, the saturated LC materials identified below provide a blue shifted absorption spectrum that supports absorption free operation through the visible and near infrared spectrum, extending in the near ultraviolet region (subject to consideration of wavelengths that would write/erase/rewrite the photoalignment layer).

c) Stability of the molecular orientation/optical performance during operation: the adaptation of fully saturated LC materials along with the novel photoalignment layers described in this disclosure provide unique benefits. Specifically, spiropyran and spiroxazene materials are chemically more stable than azobenzene materials and produce strong LC ordering extending over LC device path lengths of at least 24 µm. For saturated LC materials, the lack of a delocalized π electron system minimizes the potential coupling with the intense optical field of the laser, completely eliminating third-order nonlinear optical reorientation of the LC molecular axis which, although known to occur in unsaturated LC materials, is slow (on the order of several seconds) and at best would produce some loss of alignment, which could be corrected easily by refreshing the written pattern with another optical write cycle. The combination of strong, rewritable LC surface anchoring with a nearly nonexistent LC reorientational response to strong incident laser fields allows the desired optical patterns to be written and maintained for a duration of time that could meet or exceed the requirements/specifications for the intended applications.

d) Ability to change optical pattern while maintaining optical quality: the novel photoalignment layers disclosed in this patent provide the ability to reproducibly write, store and erase high-resolution optical patterns with minimal loss of resolution and contrast after multiple write/erase cycles, and resistance to image-sticking and burn-in.

The following sections provide background on certain fundamental issues applicable to the light valves described in this patent.

Light Valve Design

The ability to produce precise spatial shaping of the amplitude or phase of an incident high-energy laser beam is a key requirement for a number of applications in optics and photonics. One example is in high-energy laser systems employing large-scale 1053 nm Nd:glass beamlines to either pre-compensate for spatial-gain variations or maximize the energy extraction using apodized high-order super-Gaussian beams. Laser beam shaping in such systems has employed binary devices composed of distributions of opaque pixels with transmission equal to either 0 or 100%. These devices are typically in the form of a metal film deposited on a transparent glass substrate which, when positioned appropriately in the laser beam, produce a continuous beam profile after far-field Fourier filtering and re-imaging.

Metal-mask beam shapers are prepared using standard photolithographic processing techniques widely employed in the semiconductor fabrication industry and are relatively inexpensive to make, but have two key limitations: (1) a new mask must be generated if it is desired to change the shaping pattern (i.e., real-time manipulation of the spatial amplitude distribution is not possible); and (2) because the metal mask controls the beam shaping profile by spatially-distributed absorption of the near-IR laser energy by the metal pixels, the resistance of these devices to damage by the incident laser energy is very small (~200-700 mJ/cm2 at 1053 nm, 1 ns pulse). As a result, these devices are limited to use only in low-fluence areas of the laser system.

An alternative method utilizes LC materials in either active (electric-field-driven control of the optical characteristics of the device) or passive (fixed optical properties, e.g. Dorrer et al., 2011). Such LC materials and devices have demonstrated significant potential for both polarization control and beam-shaping of relatively high-power near IR lasers, and have an extended track record of proven performance in various locations in both the 60-beam, 40-TW OMEGA and 4-beam, 4 petawatt Nd:glass laser systems in the Omega Laser Facility at the University of Rochester's Laboratory for Laser Energetics (LLE).

Specific advantageous properties of LC-based devices include scalability to apertures of 200 mm or larger, cost effectiveness, high optical quality with low loss and high contrast, broad angular tolerance, ability to tune optical properties through LC material composition and, most importantly, a relatively high intrinsic laser damage resistance, as demonstrated with current generation materials. However, the inventor has discovered that, by suitable tailoring of the LC material's molecular structure, the damage threshold can be increased significantly beyond current benchmark values, not only in the near infrared spectral range but also through the near ultraviolet spectral range (subject to consideration of the wavelengths that would write, rewrite, and/or erase the pattern written into the photoalignment layer).

Alignment Layers and Photoconductive Films

Alignment layers in LC devices serve to establish a uniform alignment direction of the LC material throughout the bulk of the LC fluid layer, which significantly improves optical contrast and minimizes defects. The LC molecules at the surface of the alignment layer are tightly bound in a particular orientation determined by the boundary conditions and the elastic deformation energy of the LC molecules, which in turn depends upon the particular surface treatment employed. Commercially available LC devices are typically fabricated by rubbing (buffing) the alignment layer in a particular direction before device assembly to establish the molecular alignment direction of the LC. Typically a polyimide alignment layer is employed, although other polymers (e.g., Nylon 6/6) have also been used.

Photolithographic patterning of UV photosensitive LC alignment layers with linearly polarized UV light has been used to fabricate passive LC beam shaper devices with spatially varying molecular orientations. These photoalignment materials have high near IR laser damage thresholds. Coupled with the ability to generate an almost infinite variety of binary and gray-scale apodization and beam-shaping profiles by the photoalignment process, the high laser-damage threshold, ease in processing flexibility, and the ability to scale to large apertures through conventional contact photolithography techniques make this type of device ideal for passive beam-shaping applications in high-fluence areas of high-power laser systems. A significant short-coming of this type of LC beam shaper for many applications is that its shaping profile is static; the photo-patterned LC pixel orientations cannot be changed or erased once they have been written, which necessitates fabrication of a new device for each desired beam shaping profile.

Active LC beam shaper devices provide "real-time", spatially-distributed amplitude and phase modulation of laser beams using matrix-addressed LC electro-optical spatial light modulators (SLM's). One example of this type of device is the commercially available liquid crystal-on-silicon (LCOS) reflective SLM's for programmable beam shaping at high spatial resolution (typically 600×792 pixels) in low-fluence areas of high-peak-power lasers such as the 4 petawatt OMEGA EP laser and the Multi-Terawatt (MTW) laser at LLE. Each 10 µm×10 µm LCOS-SLM pixel can apply a programmable phase change to the beam, while transmission is controlled by adjusting the SLM's phase-modulation depth. For real-time control of the LCOS SLM device, the SLM image plane is captured using a near-field camera and the beam wave front is measured with a wave front sensor. The 2-D near-field and wave front profiles are used to provide closed-loop feedback control of the SLM. A computer program iteratively controls the SLM based on the measured 2-D profiles to achieve the desired profile.

Matrix-addressed electro-optical LCOS-SLM devices allow for considerable flexibility for real-time beam shaping but the requirement for patterned metal-oxide conductive coatings on the inner cell surfaces makes device assembly complicated, and, most importantly, significantly reduces the amount of laser fluence that the device can handle before incurring permanent and catastrophic modification (damage). It has been recently shown that the onset of damage (threshold) is determined by the absorption and heating of a nanoscale region of a characteristic size reaching a critical temperature, which is applicable to indium tin oxide (ITO) films (exhibiting laser damage threshold at 1054 nm, 2.5 ns of about 250 mJ/cm$^2$) and also to conductive wide band-gap semiconductors (damage threshold on the order of 5 J/cm$^2$).

Electrically-biased, transmissive single pixel optically addressed LC light valve technology have also been employed for active beam shaping. This LC device contains continuous (un-patterned) metal-oxide electrodes on the both of the cell's inner substrate surfaces and a secondary bismuth silicon oxide (BSO) photoconductive film on top of one of the conductive-oxide coated surfaces. An AC bias voltage adjusted to be slightly below the threshold voltage for LC reorientation is applied to the indium-tin oxide (ITO) conductive coatings and the desired bit-mapped, beam shaping image is projected onto the BSO photoconductive film using light from a 470-nm light-emitting diode (LED) source. The spatially distributed UV intensity induces a corresponding spatially distributed localized DC voltage that, when combined with the AC bias voltage across the ITO electrodes, causes the LC molecules in the illuminated areas to reorient and modulates the polarization of the 1053-nm incident laser beam.

Although this electrically-biased OALV approach significantly simplifies both device fabrication and operation as compared to the matrix-addressed LCOS-SLM device, it nevertheless suffers from the same fundamental limitation for applications in high-power laser beam shaping that are germane to electro-optical LC devices: the inherent low near IR laser-damage threshold of the internal conductive coatings required in order for the electric field to penetrate the LC material and induce molecular reorientation.

LC Materials

Liquid crystal materials exhibit properties of both fluids (inability to support a shear stress) and crystalline solids (ordered molecular orientation) and, in general, they partially or fully lack positional molecular order. The two main classes of LC's, (thermotropic and lyotropic) are distinguished by the physical parameters that control over what conditions the liquid crystalline phase will appear (changing temperature or changing solution concentration, respectively). The most common thermotropic LC materials consist of either rod-like (calamitic) or disk-like (discotic) molecules. Calamitic LC materials can exhibit several different mesophases (e.g., nematic, smectic, and cholesteric phases) that differ depending on the molecular structure of the material and the degree of order of the mesophase. The directional molecular ordering characteristic in these mesophases gives rise to useful properties (e.g., optical and dielectric anisotropy) and are thus particularly suitable for optical applications.

Both the magnitude of the refractive indices and the absorption spectra characteristics are of fundamental importance in LC materials suitable for optical applications and are determined by the molecular and electronic structure of the material. The majority of liquid crystals reported to date consist of either saturated cyclohexane rings (in which no double bonds or $\pi$ electrons are present) or unsaturated phenyl rings (which contain delocalized $\pi$ electrons); the latter make the largest contribution to the optical absorption and refractive indices of the LC molecules. Cyclohexane rings contain only $\sigma$-electrons and their electronic transitions are blue shifted compared to those of unsaturated molecules.

Laser-induced damage is determined by the formation of an observable material modification, which requires the deposition of laser energy into the material. The energy-coupling mechanisms are largely dependent on the electronic structure of the material, the presence of absorbing defects structures, and the associated excitation (laser) parameters. In the case of LC materials, defects may be intrinsic (such as related to molecular orientation and domain boundaries) or extrinsic (impurities, substrate defects or inclusions).

Specific Issues for High Power Laser Applications

The development of addressable optical light valves that exhibit enhanced performance for high average power and/or peak intensity laser applications involves a number of important technical issues to be addressed that relate to the properties of the constituent materials. These include:

a) High damage threshold to enable operation at increased laser fluences, which dictates that individual components and materials used in the device exhibit high damage resistance.

b) Low absorption at the operational (laser) frequency to reduce excessive heating of the device with subsequent changes in the optical properties of the switching medium.

c) Stability of the molecular orientation/optical performance upon repeated exposure to elevated temperatures and the polarized electric field of the laser.

d) Ability to reproducibly write and erase optical patterns in application-relevant time scales while maintaining optical quality (i.e. be resistant to image-sticking or burn-in).

In one example, a beam shaping system includes: (a) a liquid crystal beam shaper, the beam shaper including a photoswitchable alignment layer, the photoswitchable alignment layer having at least one of a PESI-F, SPMA:MMA 1:5, SPMA:MMA 1:9, or a SOMA:SOMA-p:MMA 1:1:6 material; and (b) an optical writing and erasing sub-system configured to write, erase, and rewrite a plurality of optical patterns in the photoswitchable alignment layer.

In some instances, the photoswitchable alignment layer may have an N-on-1 laser induced damage threshold of 80-100 $J/cm^2$ at 1053 nm.

In some instances, at least some liquid crystals of the beam shaper may include at least one of partially saturated liquid crystals, fully saturated liquid crystals, partially fluorinated liquid crystals, or perfluorinated liquid crystals.

In some instances, at least some liquid crystals of the beam shaper may be at least one of a phenylcyclohexane, cyclo-cyclohexane, or a perfluorinated material.

In some instances, the liquid crystal beam shaper may be an all-optical liquid crystal beam shaper.

In some instances, the liquid crystal beam shaper may include: (i) a first transparent glass substrate including a first coating on an inner surface of the substrate, the first coating being the photoswitchable alignment layer; (ii) a second transparent glass substrate including a second alignment coating on an inner surface of the substrate, the second alignment coating being either a buffed alignment layer or a layer that has been permanently oriented using polarized UV light; (iii) the liquid crystals of the beam shaper located between the first and second substrates; and (iv) a polarizer.

In some instances, the beam shaping system is configured such that writing an optical pattern into the photoswitchable alignment layer causes a localized change in configuration of the liquid crystals, such that a laser beam passing through the liquid crystal beam shaper undergoes a localized change in polarization state.

In some instances, the polarizer is configured to pass or reject portions of the laser beam depending on the localized change in polarization state.

In some instances, the first and second transparent glass substrates are fused silica.

In some instances, the second alignment coating is an alignment coating having a fixed alignment state.

In some instances, the second alignment coating is a buffed Nylon 6/6, ROLIC ROP 203/2CP, Polymer 3, or a LIA-01 material.

In some instances, the optical writing and erasing sub-system includes: (i) a UV light source and a spatial light modulator configured to write an optical pattern on the photoswitchable alignment layer; or (ii) a raster-scanned UV laser source configured to write the optical pattern on the photoswitchable alignment layer.

In some instances, the optical writing and erasing sub-system is configured to erase the written optical pattern by application of UV light having a different polarization than the UV light used to write the optical pattern, or by application of visible light.

In another example, a beam shaping system may include: (a) a liquid crystal beam shaper, the beam shaper including a photoswitchable polymer command surface, the photoswitchable polymer having an N-on-1 laser induced damage threshold ($J/cm^2$) of 80-100 at 1053 nm; and (b) an optical writing and erasing sub-system; the photoswitchable polymer command surface and the optical writing and erasing sub-system configured to write, erase, and rewrite a plurality of optical patterns in the photoswitchable alignment layer.

In some instances, at least some liquid crystals of the beam shaper are partially saturated liquid crystals, fully saturated liquid crystals, partially fluorinated liquid crystals, or perfluorinated liquid crystals.

In some instances, the liquid crystal beam shaper is an all-optical liquid crystal beam shaper.

In another example, a beam shaping system may include: (a) an all-optical liquid crystal beam shaper, the beam shaper having: (i) a first transparent glass substrate having a first coating on an inner surface of the substrate, the first coating comprising a photoswitchable alignment material comprising at least one of a SPMA:MMA 1:5, SPMA:MMA 1:9, or a SOMA:SOMA-p:MMA 1:1:6 material; (ii) a second transparent glass substrate having a fixed alignment coating on an inner surface of the substrate; (iii) liquid crystals between the first and second glass substrates, wherein at least some liquid crystals of the beam shaper are a phenylcyclohexane, cyclo-cyclohexane, or a perfluorinated material; and (iv) a polarizer; and (b) an optical writing and erasing sub-system configured to write, erase, and rewrite a plurality of optical patterns in the first coating.

In some instances, the beam shaping system is configured such that writing an optical pattern into the first coating causes a localized change in configuration of the liquid crystals, such that a laser beam passing through the liquid crystal beam shaper undergoes a localized change in polarization state.

In some instances, the polarizer is configured to pass or reject portions of the laser beam depending on the localized change in polarization state.

In some instances, the optical writing and erasing sub-system includes: (i) a UV light source and a spatial light modulator configured to write an optical pattern on the first coating; or (ii) a raster-scanned UV laser source configured to write the optical pattern on the first coating.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Optically Addressable Light Valve Design

Figure 1:
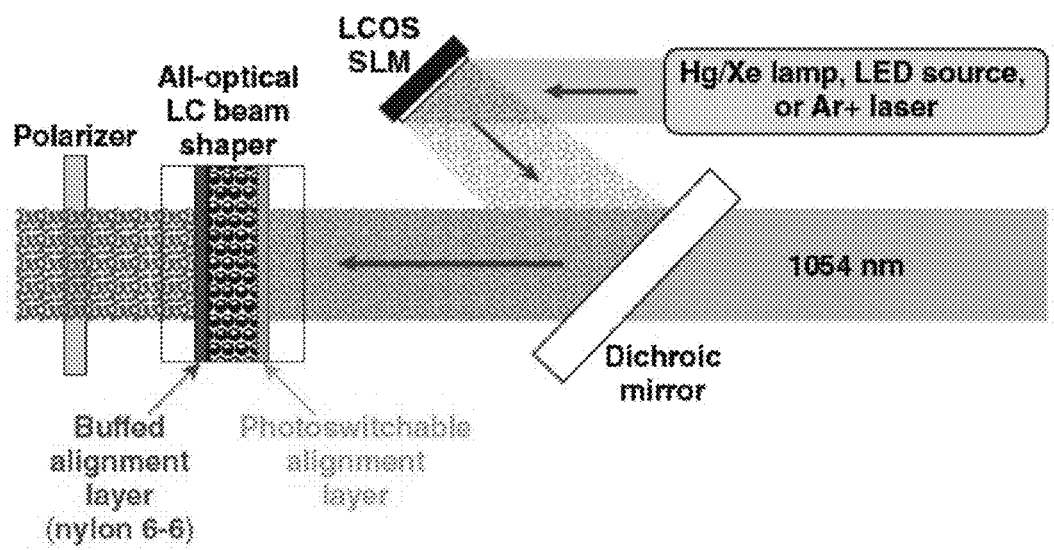
FIG. 1 shows an example of an optically addressable light valve.

A major limitation in current OALV designs is the use of conductive coatings that are known to reduce the damage threshold and increase absorption. FIG. 1 schematically shows an example of an optically addressable light valve design that does not require the use of conductive coatings and that employs a photo-switchable alignment layer instead.

FIG. 1 shows an all-optical beam shaper using a photo-switchable polymer, or "command surface," as an alignment coating. Incident low power UV light from a variety of sources (here, either an Hg/Xe lamp, LED source, or Ar+ laser) provides the "write" illumination to a liquid crystal on silicon (LCOS) device, whose image plane is focused onto the photoalignment layer within the beam shaper. Patterns produced on the LCOS are written, erased, and rewritten on the photoalignment layer using either alternating UV incident polarizations or serial applications of UV and visible light. Alternatively, patterns can be written and erased directly using a raster-scanned polarized UV laser source or in other manners.

The device shown in FIG. 1 utilizes two different LC alignment layers located on each inner substrate surface that is in contact with the LC material. In FIG. 1, one alignment layer is a buffed nylon 6/6 passive alignment layer. Such materials are currently used as alignment layers for LC waveplates in OMEGA and are known to have 1053 nm, 1 ns laser-damage threshold in the near-IR of 9-14 $J/cm^2$, depending on whether the coating is buffed or pristine (not buffed), respectively. See (1) Jacobs, S. D., Cerqua, K. A., Marshall, K. L., Schmid, A., Guardalben, M. J. and Skerrett, K. J., "Liquid-crystal laser optics: Design, fabrication, and performance," J. Opt. Soc. Am. B 5(9), 1962-1979 (1988); (2) Schmid, A., Papernov, S., Li, Z.-W., Marshall, K., Gunderman, T., Lee, J.-C., Guardalben, M. and Jacobs, S. D., "Liquid-crystal materials for high peak-power laser applications," Mol. Cryst. Liq. Cryst. 207, 33-42 (1991). In other examples, a "write-once" photoalignment layer can be substituted for the buffed alignment layer. Options for a passive photoalignment layer include, without limitation, Nylon 6/6 (Poly(N,N'-hexamethyleneadipinediamide)), ROLIC ROP 203/2CP (a cinnamate photopolymer available from ROLIC Corp, Switzerland), Polymer 3 (a coumarin-based photoalignment layer material), and LIA-01 (an azobenzene photoswitchable alignment layer available from DIC Corp, Japan).

In FIG. 1, the second substrate contains a photoswitchable "command surface" polymer alignment layer that undergoes a reversible change in molecular shape or orientation when exposed sequentially to low incident energy UV or visible light (or UV light with two different polarization states). Using any number of imaging techniques (contact photolithography, laser raster-scanning, or projecting a pattern in the image plane of an LCOS¬SLM onto the coated surface using a polarized light source), spatially distributed alignment states can be written, erased, and re-written into this "all-optical" photoswitchable LC beam shaper, thereby duplicating the behavior of an electro-optical SLM or electrically-biased OALV without the need for conductive coatings. As shown in FIG. 1, either incoherent or coherent UV sources (Hg/Xe lamp, LED, argon-ion, or helium-cadmium laser) can be used to provide the incident write illumination to the LCOS device or, alternatively, directly to the all-optical LC beam shaper if another image generation process is desirable (e.g., laser raster-scanning).

Unlike earlier OALV devices, the written state in these photoswitchable alignment layers requires no applied electrical or optical fields to remain stable for extended periods of time (weeks or longer) under normal ambient conditions, provided that background UV or visible light intensity remains below the threshold intensity required to change the orientation of the command surface. This switching threshold is a function of the molecular structure of the command-surface material and can be controlled by molecular design to be as low or high as necessary to suppress switching by ambient effects. Write-erase times are dependent on the incident UV energy, and can be as fast as 10 ms.

Figure 2:
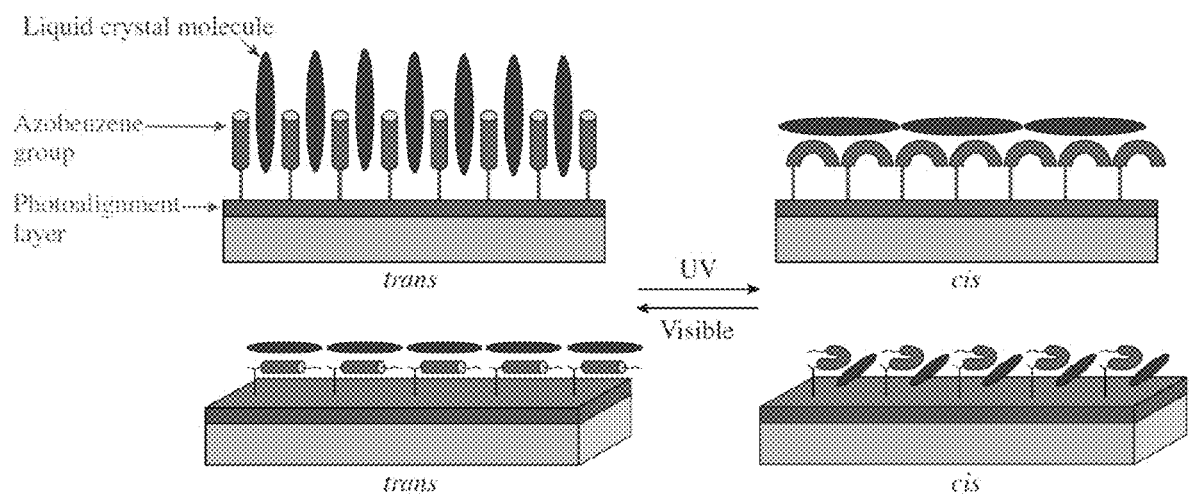
FIG. 2 shows an example of a photoswitchable command surface.

The pendants on this photoswitchable command surface are switched optically between two different alignment states, which in turn redirects the orientation of the LC material in contact with the coating surface in response to wavelength of the polarized "write" (UV) or "erase" (visible) incident light. FIG. 2 shows an example of a photoswitchable command surface including azobenzene pendant groups. The azobenzene groups, in the elongated trans state (left) cause LC molecules to adopt an orientation parallel to the azobenzene long molecular axis, while azobenzenes in the bent cis state (right) switch the orientations of the LC to a near-parallel orientation to the substrate to minimize their free energy. Depending on the molecular structure of the command surface, the resultant LC reorientation can occur either out of the substrate plane (top) or in the plane of the substrate (bottom). This change in orientation induces a change in the polarization, phase, or amplitude of an incident optical beam, depending on the optics in the system.

Although not specifically shown in FIG. 1 or 2, the outer surface of the substrate(s) may include anti-reflection (AR) coatings to minimize back-reflection and other stray light that could, in some instances, have a negative effect on the pattern writing process. The AR coatings may be designed to operate at the wavelength of the write illumination source, and, for the sections in which the near IR beam passes through the substrate, a second AR coating may be required with properties optimized for the near IR.

For the all-optical near IR LC laser beam shaper (light valve) shown in FIG. 1 to be viable for high-power beam shaping applications, the resistance to laser-induced damage of its components will be an important consideration. Glass substrates, particularly fused silica, have laser damage thresholds at 1064 nm in excess of 60 $J/cm^2$. In addition, it has been previously shown that photoalignment materials have exceptional near IR laser damage thresholds, approaching that of conventionally polished fused silica [See "Photoaligned Liquid Crystal Devices for High-Peak-Power Laser Applications," K. L. Marshall, C. Dorrer, M. Vargas, A. Gnolek, M. Statt, and S.-H. Chen, in Liquid Crystals XVI, edited by I. C. Khoo (SPIE, Bellingham, Wash., 2012), Vol. 8475, Paper 84750U (invited)]. Furthermore, Marshall et al. reported in 2013 the first near IR damage threshold measurements on the commercially available azobenzene photoswitchable alignment layers PAAD 22, PAAD 27, and PAAD 72 [reference: "Liquid Crystal Near-IR Laser Beam Shapers Employing Photoaddressable Alignment Layers for High-Peak-Power Applications," K. L. Marshall, D. Saulnier, H. Xianyu, S. Serak, and N. Tabiryan, in Liquid Crystals XVII, edited by I. C. Khoo (SPIE, Bellingham, Wash., 2013), Vol. 8828, Paper 88280N]. These materials exhibited 1053 nm, 1.4 ns laser damage thresholds as high as 66 $J/cm^2$.

The ability to reversibly write high-resolution optical patterns into an LC device containing azobenzene photoswitchable alignment layers has been known and investigated for a number of optics and photonics applications other than laser beam shaping since the early 2000's. In August of 2018, Marshall et al. demonstrated the ability to write optical patterns at a resolution of 28.5 line pairs/mm using a UV light source and a photolithographic mask into a LC device employing commercial PAAD 27 azobenzene photoswitchable alignment layers, but several problems affecting device operational lifetime were encountered: (1) devices could only be written and erased up to six times before significant resolution degradation was observed, and (2) "image sticking" (reappearance of multiple patterns from previous exposures) occurs after several sequential patterning cycles. [See "Optically Addressable Liquid Crystal Laser Beam Shapers Employing Photoalignment Layer Materials and Technologies", K. L. Marshall, J. Smith, A. Callahan, H. Carder, M. Johnston, and M. Ordway, presented at the SPIE Optics and Photonics Liquid Crystals XXII Symposium, San Diego, Calif., 19-23 August 2018.]

In order for an all-optical LC beam shaper device to realize its full applications potential and advance the state of the art for high-power beam shaping applications such as additive manufacturing, new photo switchable alignment layer materials are needed whose molecular structures and switching mechanisms will provide (1) excellent near IR laser damage threshold; (2) the ability to reproducibly write, store and erase high-resolution optical patterns; (3) minimal loss of resolution and contrast after multiple write/erase cycles, and (4) be resistant to image-sticking and burn-in of previously written patterns. In addition, the LC materials ideally will provide a similarly high damage threshold.

Photoswitchable Alignment Layer Materials for High-Power Laser Beam Shaping

The inventor has developed several unique photoswitchable LC alignment polymer coatings based on azobenzene, spiropyran and spiroxazane photoactive pendants. Spiropyrans and spiroxazanes differ fundamentally from the azobenzene photoswitchable coatings in that photoswitching occurs due to a reversible photomediated ring opening/closing reaction upon absorption of UV and visible light rather than through photomechanical trans-cis isomerization, in which no chemical bonds are broken.

Figure 3:
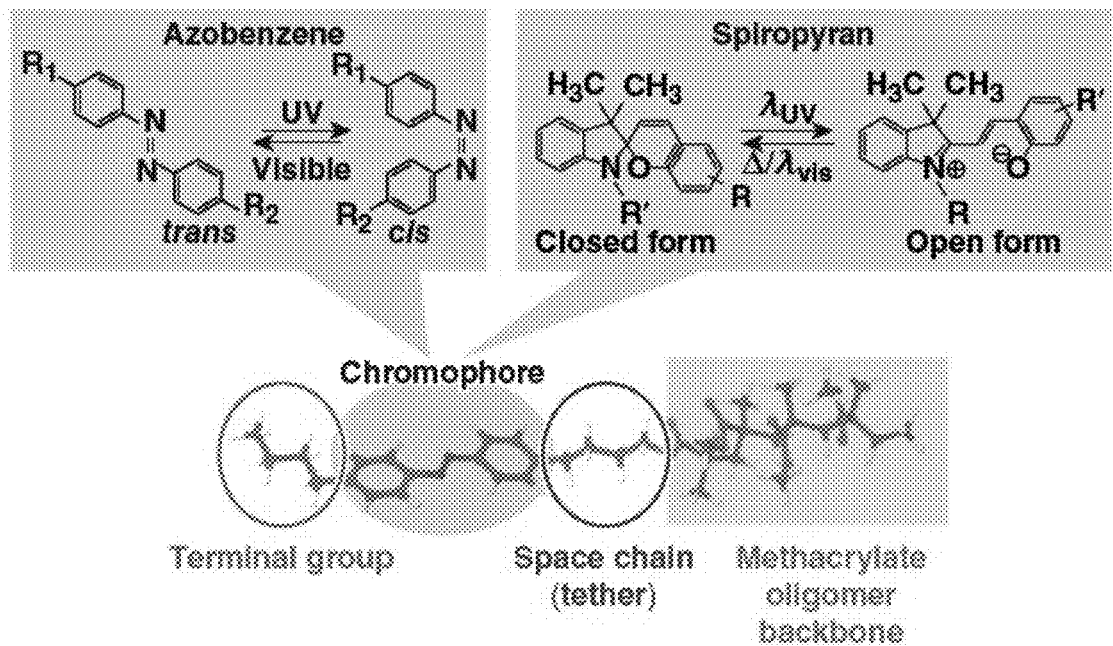
FIG. 3 shows examples of photoswitchable LC alignment materials.

The generalized schematic diagram for these new materials is shown in FIG. 3. FIG. 3 shows a photoswitchable alignment material in which the chromophore containing appropriate terminal group (as shown, either azobenzene or spiropyran) is tethered to a polymer backbone by a flexible alkyl spacer chain. In FIG. 3, for photoswitchable LC alignment materials utilizing azobenzene as a chromophore, a reversible photomechanical trans-cis photoisomerization is employed. For spiropyran (shown) and spiroxazane chromophores, a photomediated ring opening/closing reaction is employed.

Specifically, three photoswitchable alignment material families were developed:

1. PESI-F

Figure 4A:
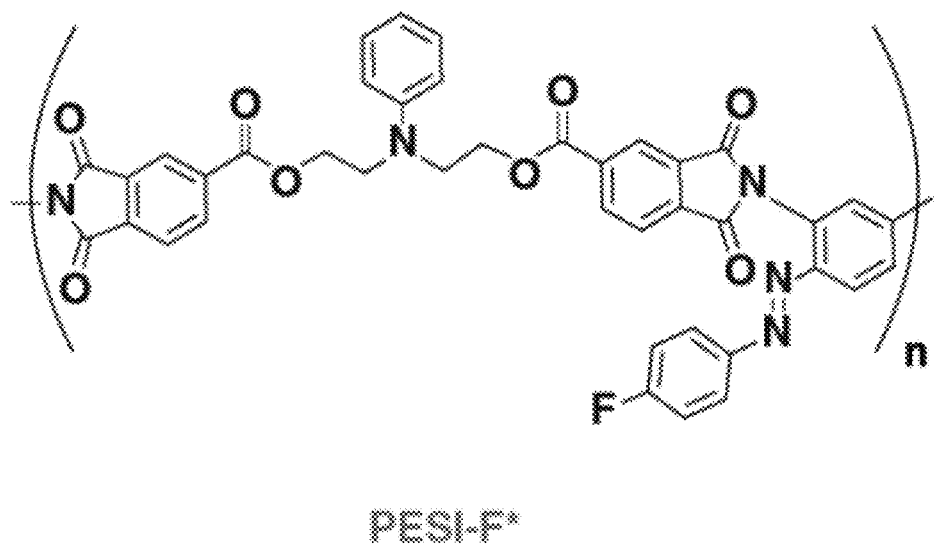
FIGS. 4(A) and (B) show the chemical structure of the poly(estermide) PESI-F.
Figure 4B:
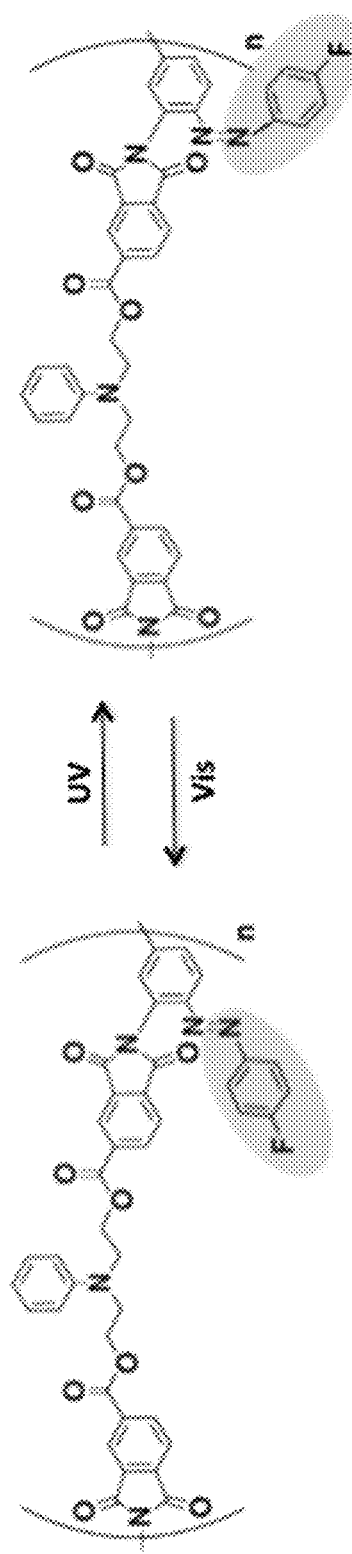

FIG. 4(A) shows the chemical structure of the poly (esterimide) PESI-F. This material is an indolene polymer with azobenzene chromophores partially incorporated in the backbone and not through a flexible tether. FIG. 4(B) shows how the material switches in response to UV and visible light. Weglowski et al. (Opt Commun 400, 144 (2017)) reported these materials to be useful for fabrication of photochromic diffraction gratings, but, to the best of the inventor's knowledge, it had not been previously known prior to the inventor's discovery to use PESI-F in a photoswitchable LC alignment layer.

Figure 5:
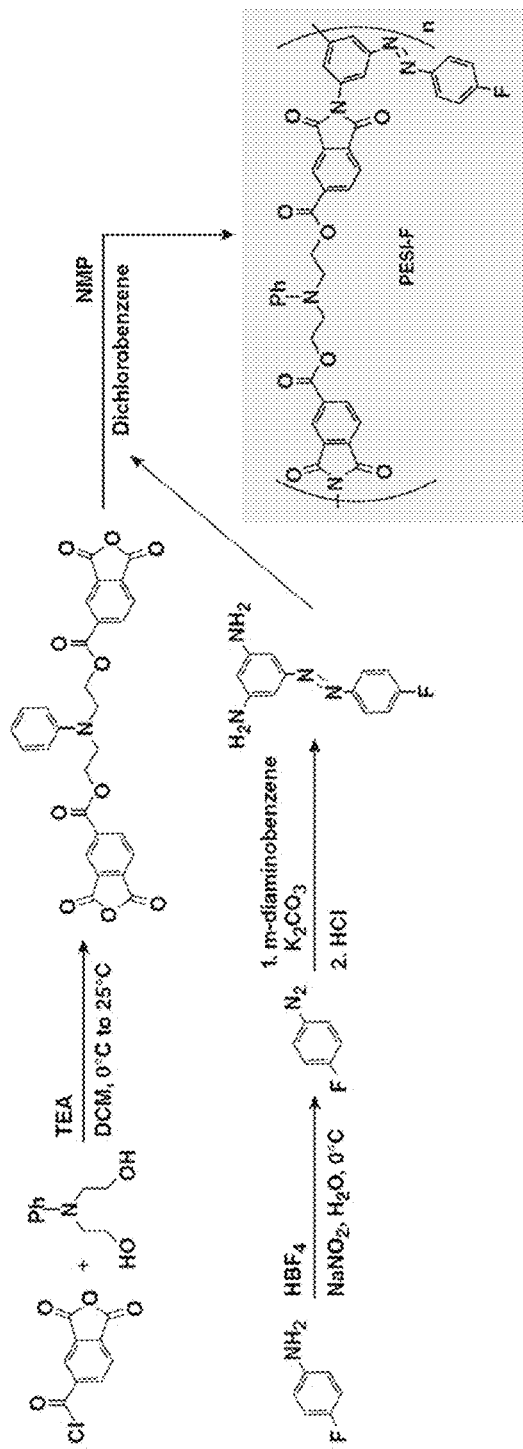
FIG. 5 shows an example of PESI-F synthesis.

FIG. 5 shows one example of how PESI-F may be synthesized, with an overall product yield of approximately 10%. [See A. Kozanecka-Szmigiel et al., *Dyes Pigments* 114, 151 (2015).]

2. SPMA:WA (1:5 and 1:9)

Figure 6:
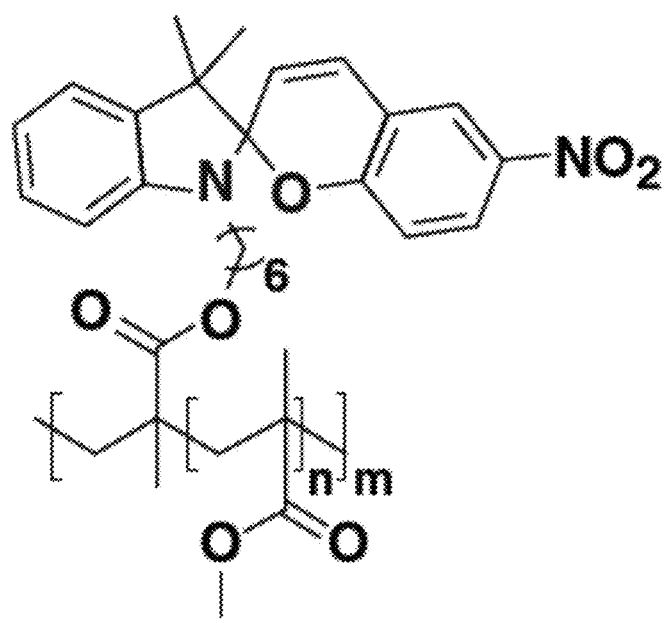
FIG. 6 shows the chemical structure of SPMA:MMA.

These materials are methacrylate copolymers containing spiropyran chromophores with a $NO_2$ terminal group attached to a methacrylate backbone through a 6-carbon alkyl spacer. The general molecular structure is shown in FIG. 6. Spiropyran copolymers with a ratio of one spiropyran monomer to five methacrylate backbone units (1:5) and a ratio of one spiropyran monomer to nine methacrylate backbone units (1:9) have been shown to be useful. To the best of the inventor's knowledge, it had not been previously known prior to the inventor's discovery to use these spiropyran copolymers to function as LC alignment layers, either write-once or photoswitchable.

Figure 7:
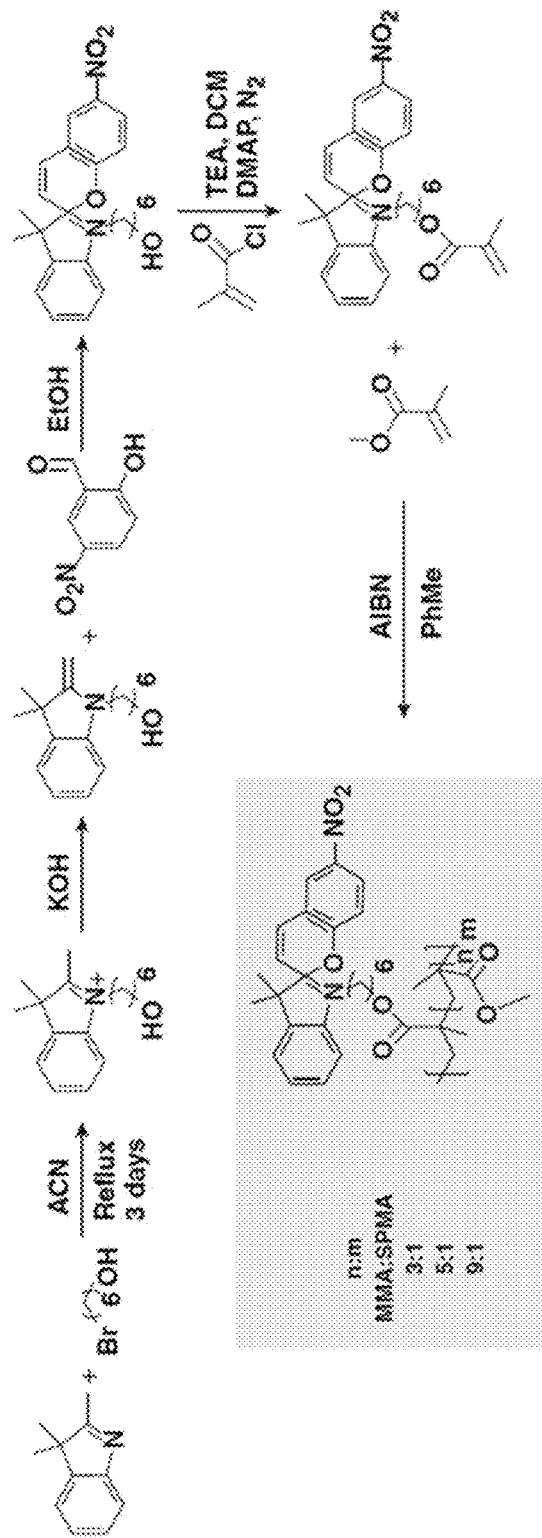
FIG. 7 shows an example of SPMA:MMA synthesis.

FIG. 7 shows one example of how SPMA:MMA may be synthesized, with an overall product yield of approximately 10%. [See S. Friedle and S. W. Thomas, Angew. Chem., Int. Ed. 49, 7968 (2010).]

3. SOMA:SOMA-PWA (1:1:6)

Figure 8:
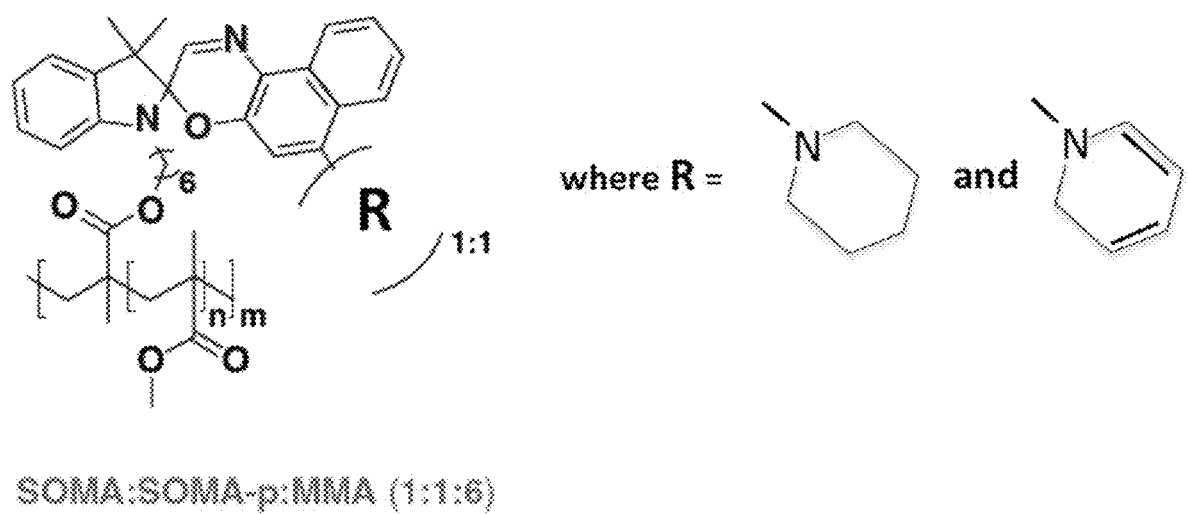
FIG. 8 shows the chemical structure of SOMA:SOMA-PMMA (1:1:6).

These materials (shown in FIG. 8) are also methacryate copolymers, but in this case contain two different spiroxazane methacrylate monomer chromophores copolymerized with unsubstituted methacrylate monomers in a ratio of one pyridine-containing spiroxazane chromophore (SOMA) to one piperidine-containing spiroxazane monomer (SOMA-p) to six unsubstituted methacrylate monomers. To the best of the inventor's knowledge, it had not been previously known prior to the inventor's discovery of the ability of these spiroxazane copolymers to function as LC alignment layers, either write-once or photoswitchable.

Figure 9:
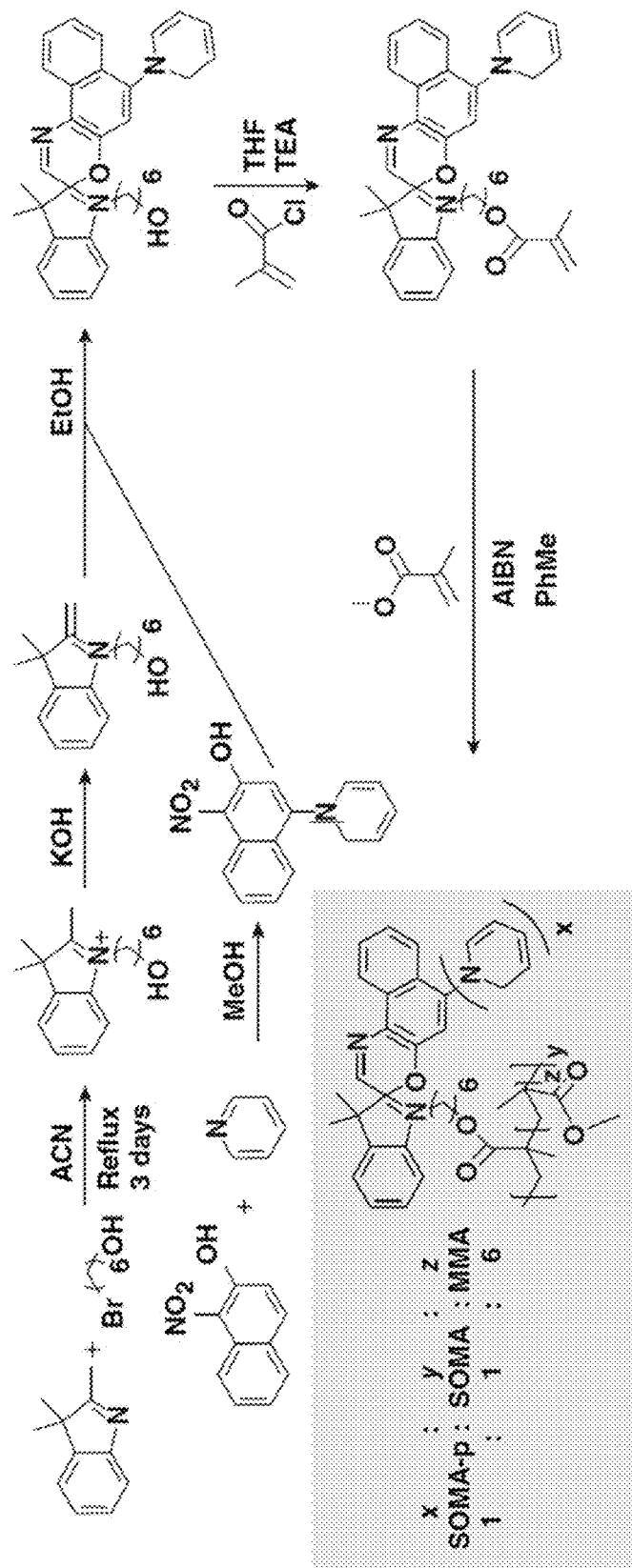
FIG. 9 shows an example of SOMA:SOMA-PMMA (1:1:6) synthesis.

FIG. 9 shows one example of how SOMA:SOMA-PMMA (1:1:6) may be synthesized, with an overall product yield of approximately 10%. [See T. H. Tan et al., Tetrahedron 61, 8192 (2005); and M. Fan et al., J. Chem. Soc. Perk. T 2, 1387 (1994).]

4. Suitability for Photoswitchable Alignment Layers

Figure 10:
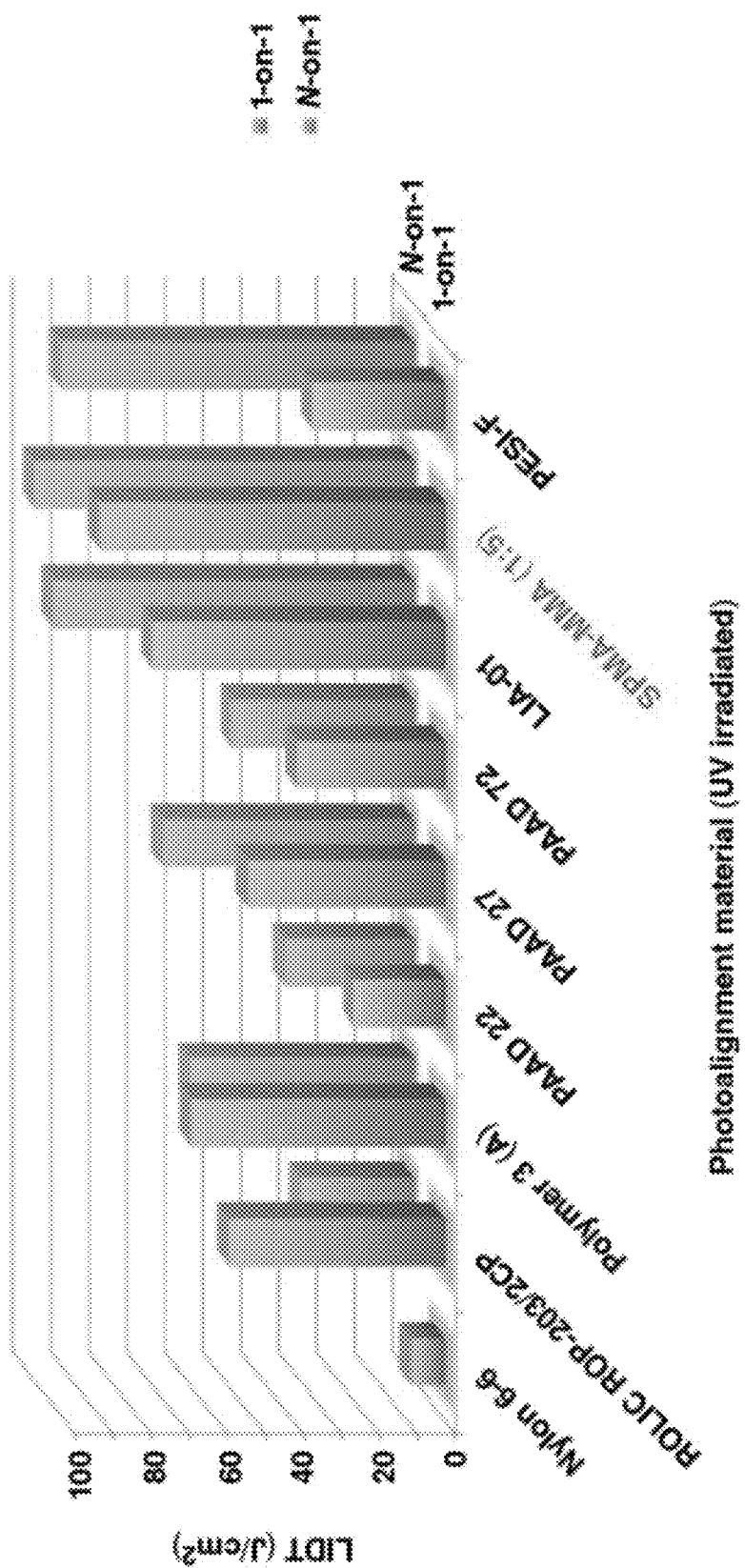
FIG. 10 is a chart of laser induced damage thresholds at 1053 nm for various photoalignment materials.

Materials from these three families of photoswitchable alignment layers are ideally suited for all-optical photoswitchable LC beam shapers for high power laser applications such as additive manufacturing due to their exceptionally high laser damage thresholds at 1053 nm. The 1053 nm, 1.4 ns damage thresholds of several examples of these materials compared to existing data on other LC alignment materials (buffed layers, write-once photoalignment layers, and photoswitchable alignment layers) are summarized in FIG. 10. Notably, copolymer SPMA-MMA (1:5) exhibits the highest 1053 nm laser damage threshold values ever reported for any LC alignment layer composition which, at 90-100 $J/cm^2$, is nearly two orders of magnitude higher than that of the buffed polyimide coating used in the matrix-addressed electro-optical LCOS-SLM and the electrically-biased OALV devices of the prior art. Buffed alignment layers such as those used in the matrix addressed LCOS-SLM and OALV beam shapers of the prior art have the lowest 1053 nm laser damage thresholds of the group (buffed polyimide is not shown, as its 1053 nm laser damage threshold is <1 $J/cm^2$). The ROLIC ROP 203/2CP, "Polymer 3" and LIA-01 are write-once photoalignment materials, while the three PAAD materials, PESI-F, SPMA-MMA (1:5), and SOMA:SOMA-PMMA (1:1:6) are photoswitchable.

Figure 11:
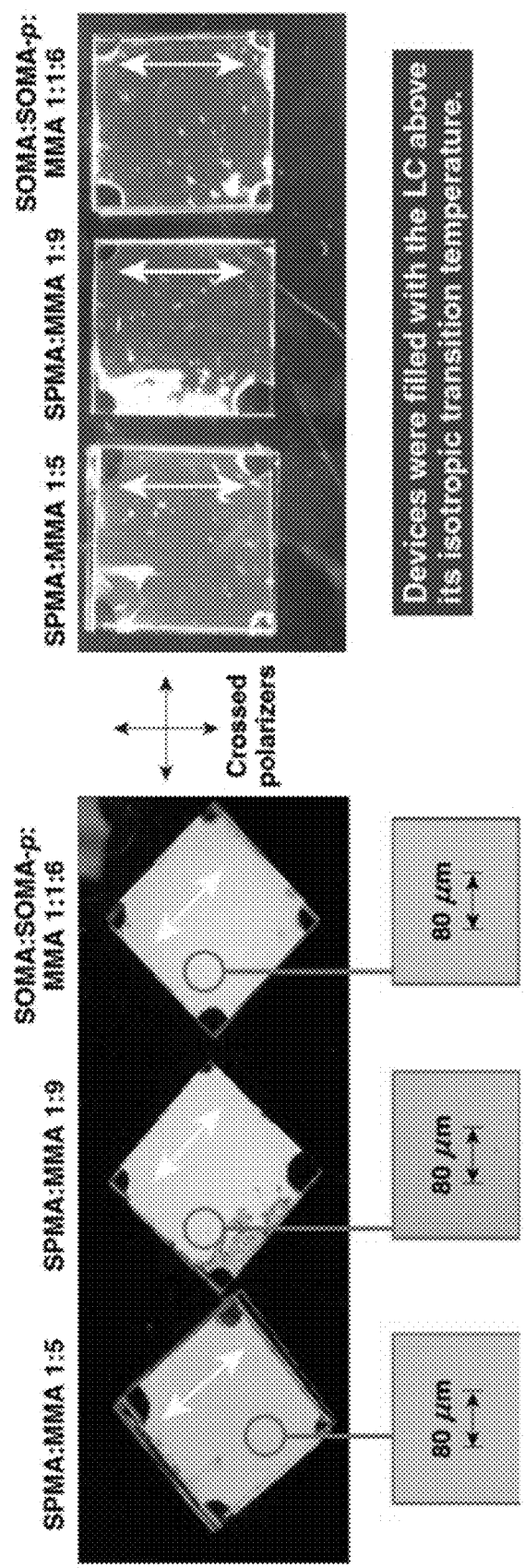
FIG. 11 shows examples of parallel-aligned, single-pixel LC devices fabricated using the spiropyran and spiroxazane photoswitchable copolymer alignment layers.

The ability to spontaneously align LC materials is an important factor in achieving beam shaper devices with high contrast ratios. FIG. 11 shows the first three single-pixel LC devices fabricated using the new spiropyran (SPMA:MMA 1:5 and SPMA:MMA 1:9) and spiroxazane (SOMA:SOMA-p:MMA 1:1:6) photoswitchable polymers viewed under crossed polarizers. Excluding fabrication defects, these photoswitchable alignment materials exhibit contrast, alignment uniformity, and write-state stability equivalent to or exceeding photoalignment materials of the prior art. The white arrows in the photographs define the alignment direction of the LC material in the device. All samples were photographed between crossed polarizers.

Liquid Crystal Materials for High Power Laser Beam Shaping

Several nematic LC materials were selected to explore the effect of varying degrees of π-electron delocalization and electron density on their damage thresholds. The aim was to provide baseline measurements on the LIDT's of currently available LC's as a function of their chemical structure and extend the limited available knowledge on LC damage thresholds for nanosecond pulses at 1053 nm to both the sub-nanosecond and nanosecond pulse length regimes at 527 nm and 351 nm. Delocalized π-electrons are found in unsaturated (e.g., benzene-like) carbon rings with double bonds, and their presence shifts the electronic absorption edge toward longer wavelengths. Saturated compounds have carbon rings with only single bonds, which essentially eliminate electron delocalization and cause the absorption edge to be shifted toward shorter wavelengths. The wide range of LC materials evaluated are shown in Table 1. LC materials with the highest degree of π-electron delocalization include the well-known cyanobiphenyl (two unsaturated hydrocarbon rings) LC materials such as 5CB (4-pentyl-cyanobiphenyl or K-15) and the eutectic mixture E7. Compounds composed of both unsaturated (benzene) and saturated (cyclohexane) rings including a 60/40 mixture of two unsaturated phenyl benzoate ester compounds (PPMeOB and PPPOB) used on the OMEGA laser and the partially saturated phenylcyclohexane-based mixture ZLI-1646 (Merck). Other materials evaluated included a saturated alkyl LC mixture (Merck MLC-6601) and a perfluorinated alkyl LC mixture (Merck MLC-2037). Finally, a saturated isothiocyanate LC compound, which includes some π-electron delocalization within the isothicyanate N=C=S group) was tested. Laser induced damage threshold values of commercially available LC compounds and mixtures determined in 1988 (using nanosecond laser pulses at 1053 nm) were re-evaluated to take into account significant improvements in purity since that time [See "Liquid-Crystal Laser Optics: Design, Fabrication, and Performance," S. D. Jacobs, K. A. Cerqua, K. L. Marshall, A. Schmid, M. J. Guardalben, and K. J. Skerrett, J. Opt. Soc. Am. B 5, 1962-1979 (1988)]. The initial work that compared an unsaturated LC compound, 5CB, to its saturated analog, ZLI-S-1185 (4-octylcyanobicyclohexyl), is expanded [See T. Z. Kosc, S. Papernov, A. A. Kozlov, K. Kafka, and K. L. Marshall, and S. G. Demos, "Laser-Induced-Damage Thresholds of Nematic Liquid Crystals at 1 ns and Multiple Wavelengths," presented at Laser Damage 2018, Boulder, Colo., 23-26 Sep. 2018].

TABLE 1

| Structure | Name | Supplier | Absorption Edge |
|---|---|---|---|
| 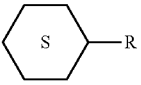 | 1550C | Dabrowski^ | 294 nm |
| 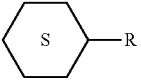 | MLC-2037 | Merck | 306 nm |
| 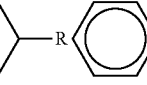 | ZLI-1646 | Merck | 324 nm |
| 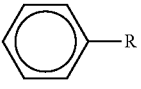 | PPMeOB/ PPPOB | LLE* | 345 nm |
| 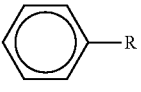 | 5CB | EMB | 377 nm |
| 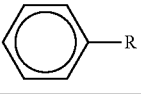 | E7 | EMB | 385 nm |

^Isothiocyanate compound synthesized by M. Dabrowski, University of Warsaw.
*A 60/40 mixture of two phenyl benzoate ester compounds used on the OMEGA laser and synthesized at LLE.

In Table 1, materials are designated as saturated and unsaturated with the symbol S or O, respectively, in the molecular structures in the first column. Note that the ZLI-1646 mixture contains contain compounds with both saturated and unsaturated ring structures. Here, the absorption edge is defined at T=98%.

Pulse Length Dependence at 1053 nm

The LIDT dependence at 1053 nm as a function of laser pulse duration was investigated at six different pulse lengths: 600 fs, 2.5 ps, 10 ps, 50 ps, 100 ps, and 1.5 ns. The 1-on-1 and N-on-1 LIDT values plotted as a function of each material's UV-absorption edge (and therefore the linear absorption cross section) are shown in FIG. 12. The saturated materials have an absorption edge<330-nm, and data for saturated and unsaturated materials can be differentiated easily. The partially saturated LC mixture ZLI-1646 behaves more like a fully saturated material, suggesting that at least in this material, the unsaturated components, which one might expect to be the 'weak links', did not adversely affect the LC mixture's performance. The LIDT values determined in this work for three common commercial LC materials (E7, SCB, and ZLI-1646) were higher than those determined for the same materials in 1988, which we attributed to advances in chemical purification processes applied to commercial LC materials in general. Of notable significance are the data at 1.5 ns, where the LIDT values of saturated LC's approach those of bare fused silica.

Figure 12A:
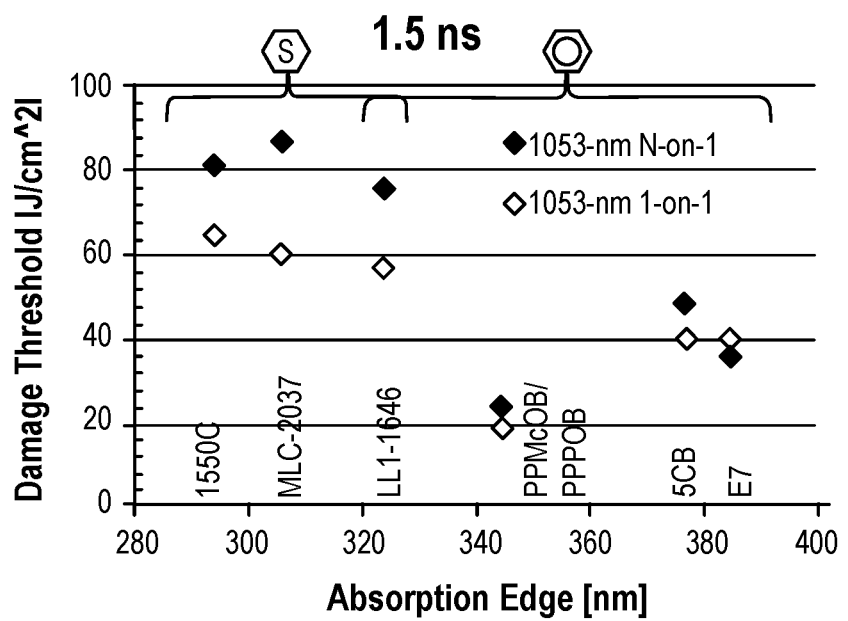
FIG. 12 is a plot of the 1-on 1 and N-on-1 LIDT values for various LC materials as a function of the UV absorption edge at various pulse lengths. The compound names and brackets identifying the saturated, unsaturated, and mixed materials in (a) apply to (b) through (d) as well.
Figure 12B:
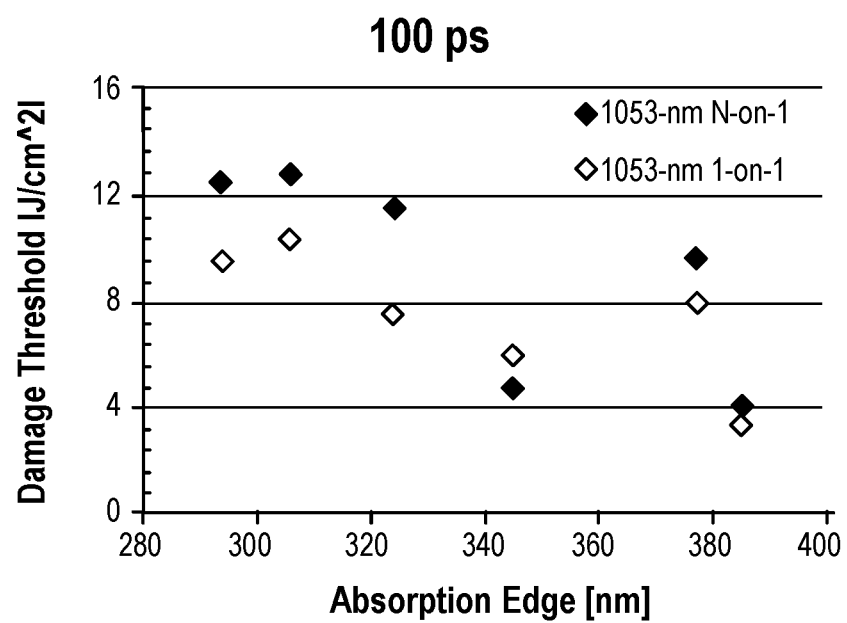
Figure 12C:
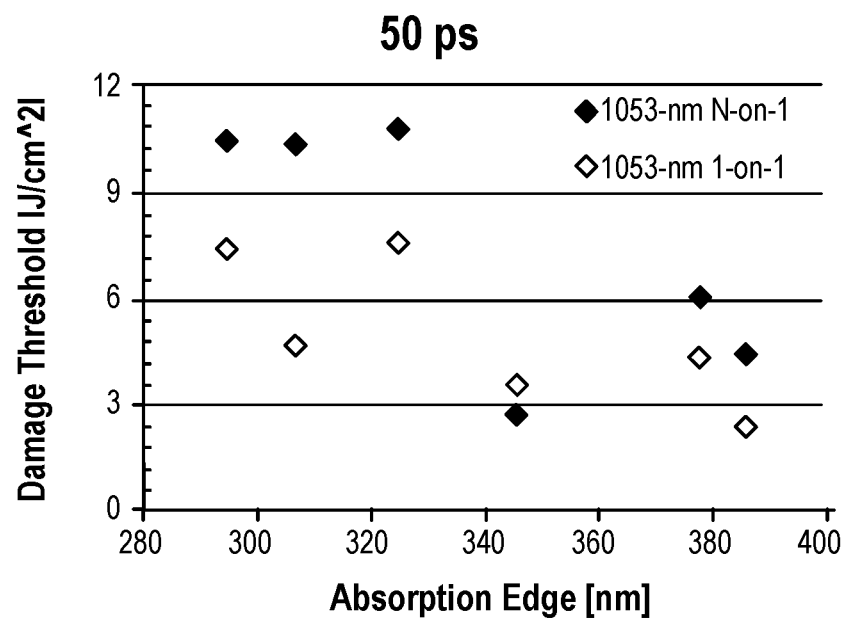
Figure 12D:
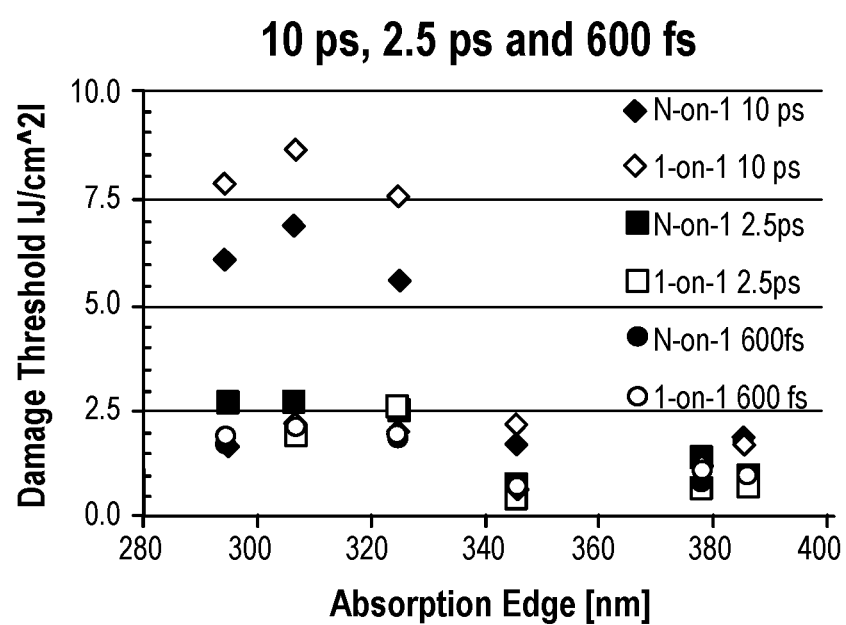

The compounds are identified in FIG. 12(a), with brackets identifying the saturated, unsaturated, and mixed materials. The results suggest that, in general, saturated materials exhibit a 2× to 4× higher LIDT than unsaturated compounds independent of pulse length. The results also show that, at pulse lengths≥50 ps, the N-on-1 LIDT exceeds the 1-on-1 LIDT for most materials. This increase in LIDT with pre-exposure to laser pulses, commonly referred to as laser "conditioning," indicates the presence of a laser-induced material modification that leads to improved materials performance. In contrast, for both saturated materials and the unsaturated mixture PPMeOB/PPPOB at 10 ps, the N-on-1 LIDT is lower than the 1-on-1 LIDT, an effect commonly referred to as "incubation." Neither conditioning nor incubation is strongly observed at either 600 fs or 2.5 ps.

Figure 13:
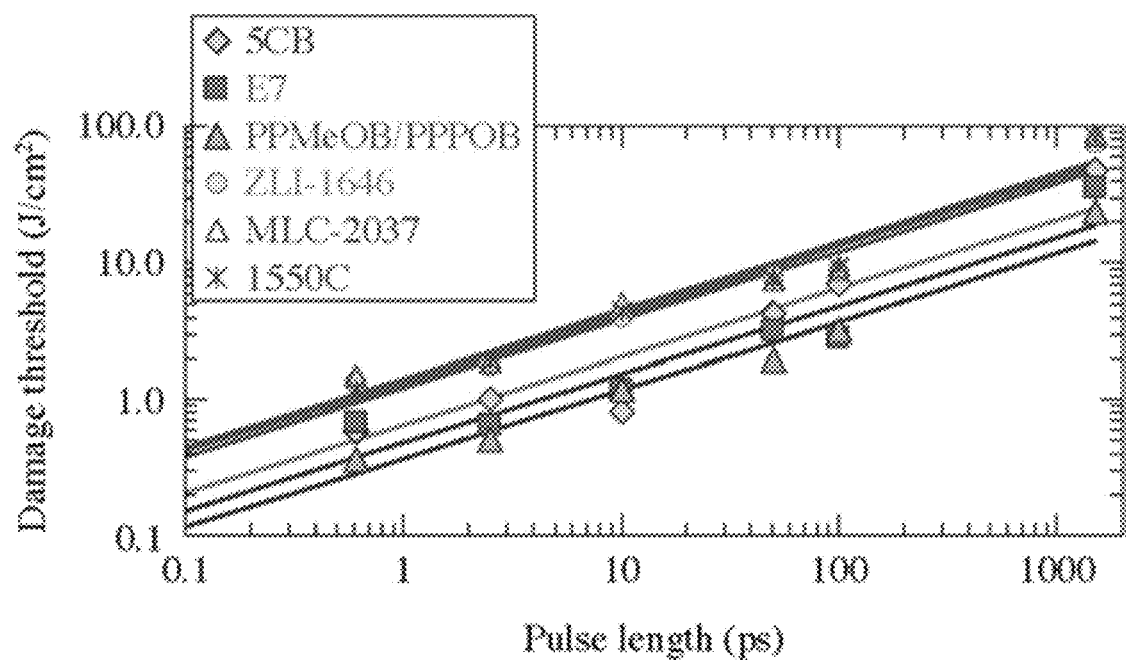
FIG. 13 shows N-on-1 LIDT values for saturated and unsaturated LC materials plotted as a function of pulse length. The $R^2$ values of the fit lines range between 0.90 (E7) and 0.96 (PPMeOB/PPPOB, 1550C, and ZLI-1646).

A clear pulse-length dependence emerges from the N-on-1 LIDT results plotted in FIG. 13 on a log-log scale and fit as a function of pulse length using $\tau^x$ power dependence, where x=0.5. Stuart showed that for dielectric materials the $\tau^{0.5}$ power scaling (though experimentally observed to vary between $0.3<x<0.6$) is valid for pulse lengths greater than 20 ps, where thermal diffusion effects govern the damage-initiation process [See B. C. Stuart, M. D. Feit, S. Herman, A. M. Rubenchik, B. W. Shore, and M. D. Perry, "Nanosecond-to-femtosecond laser-induced breakdown in dielectrics," Phys. Rev. B 53, 1749-1761 (1996)]. Defects or defect states, in particular, absorb laser irradiation, which leads to free electrons and ionization of material [See (1) M. D. Feit and A. M. Rubenchik, "Implications of nanoabsorber initiators for damage probability curves, pulse length scaling, and laser conditioning," Proc. SPIE 5273, 74-82 (2004); (2) C. W. Carr, J. B. Trenholme, and M. L. Spaeth, "Effect of temporal pulse shape on optical damage," Appl. Phys. Lett. 90, 041110 (2007); and (3) G. Duchateau, M. D. Feit, and S. G. Demos, "Strong nonlinear growth of energy coupling during laser irradiation of transparent dielectrics and its significance for laser induced damage," J. Appl. Phys. 111, 093106 (2012)]. As pulse lengths decrease below 10 ps, multiphoton ionization starts to contribute to electron production, and in the sub-picosecond range, multiphoton ionization becomes the dominant process. The approximate $\tau^{0.5}$ dependence has also been observed in biological materials [See A. Oraevsky, L. B. Da Silva, A. Rubenchik, M. Feit, M. E. Glinsky, M. Perry, B. M. Mammini, W. Small IV, and B. C. Stuart, "Plasma mediated ablation of biological tissues with nanosecond-to-femtosecond laser pulses: Relative role of linear and nonlinear absorption," IEEE J. Sel. Top. Quantum Electron. 2, 801-809 (1997)]. At this time, the fact that LC LIDT's at pulse lengths<50 ps still follow the $\tau^{0.5}$ trend reasonably well appears coincidental. The fit for saturated materials is stronger ($R^2$~0.96), and the three samples with the lowest absorption edges behave very similarly.

To better quantify the relative difference in damage thresholds between saturated and unsaturated LC materials, their value at each laser pulse length was normalized to the LIDT's of the cyanobiphenyl LC mixture E7, one of the most commonly used unsaturated LC mixture formulations. Results shown in FIG. 14 indicate that there is a difference in LIDT values between the two types of materials of about 2× for the shortest (600 fs) and longest (1.5 ns) pulse lengths tested. The dissimilarity increases at intermediate pulse lengths (2.5 ps to 100 ps) with a maximum value greater than 3× at the 10-ps pulse length. Larger LIDT variations (20% to 50%) were also observed for unsaturated LC materials as compared to those for their saturated counterparts (5% to 11%). This larger variation in the LIDT of unsaturated materials is attributed to their increased and varying amounts of π-electron delocalization.

Figure 15:
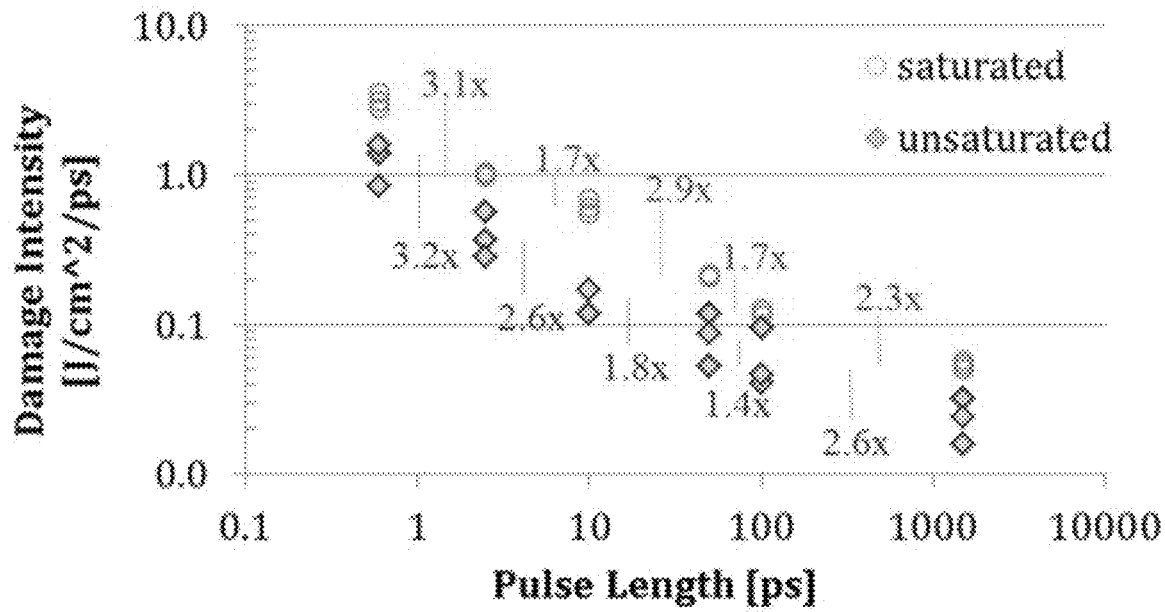
FIG. 15 is a chart quantifying the difference in intensity at the LIDT observed between successive test pulse lengths for both saturated and unsaturated materials.

The LIDT results were also examined as a function of the laser peak intensity at each pulse length. The results, shown in FIG. 15, quantify the difference in intensity at the LIDT observed between successive test pulse lengths for both saturated and unsaturated materials. FIG. 15 shows that the intensity required to induce laser damage decreases with pulse length, underscoring the likely presence of multiple damage mechanisms that are driven by differing intensity requirements. The vertical lines and associated quantification factors depict the difference between the average N-on-1 intensities (at subsequent pulse durations) required to induce damage in saturated and unsaturated materials.

At the shortest pulse lengths, both types of materials undergo a similar ~3× reduction in damage threshold intensity between 600 ps and 2.5 ps. Similarly, as the pulse duration increases from 50 ps to 100 ps and from 100 ps to 1.5 ns, the average damage intensity changes by similar amounts in each increment for both saturated and unsaturated materials (~1.5× and ~2.5×, respectively). However, around 10 ps, the damage intensity changes by differing amounts for the two materials types. Specifically, between 2.5 ps and 10 ps, the change in the damage threshold intensity is lower for the saturated materials than for the unsaturated materials (1.7× and 2.6×, respectively). This difference is reversed between 10 ps and 50 ps, where the change in the damage threshold intensity is 2.9× and 1.8× for the saturated and unsaturated materials, respectively.

Wavelength Dependence at about 1 ns Pulse Duration

The excitation process is dependent on the electronic structure of the material and, as such, should depend strongly on the laser wavelength. Nematic LC materials were tested using nanosecond laser excitation at 351-nm (third harmonic, 3ω) and 527-nm (second harmonic, 2ω) to compliment the results obtained at the fundamental 1053-nm (1ω) wavelength presented above. This multiple-wavelength investigation aims to probe the correlation between the electronic structure of each material and its laser-induced damage behavior via altering the excitation photon energy.

Figure 16:
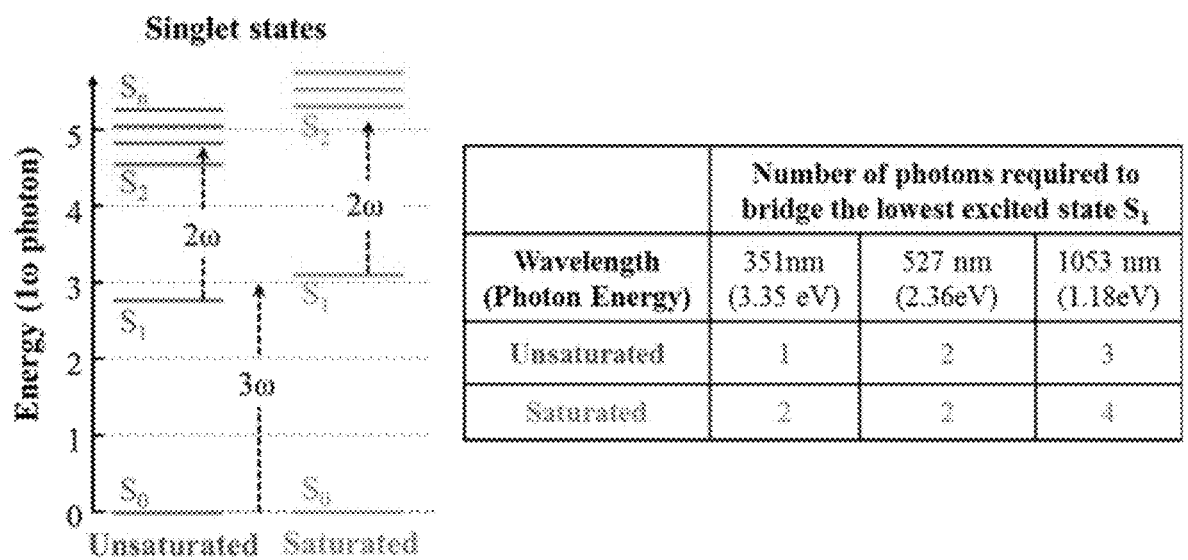
FIG. 16 illustrates certain electronic transitions leading to laser induced breakdown in LC materials.

The electronic excitation pathways in LC materials are generally known and involve a singlet ground state ($S_0$) and excited singlet ($S_1$, $S_2$, ... $S_n$) and triplet states. The time scale of the transition from the singlet states to the corresponding triplet states during relaxation, or intersystem crossing, is typically >1 ns, which has been confirmed for several unsaturated LC compounds [See (1) F. H. Loesel, M. H. Niemz, J. F. Bille, and T. Juhasz, "Laser-induced optical breakdown on hard and soft tissues and its dependence on the pulse duration: experiment and model," IEEE J Quant Elect, 32 (10), 1717-1722 1996; and (2) A. Oraevsky, L. B. Da Silva, A. Rubenchik, M. Feit, M. E. Glinsky, M. Perry, B. M. Mammini, W. Small IV, and B. C. Stuart, "Plasma mediated ablation of biological tissues with nanosecond-to-femtosecond laser pulses: Relative role of linear and nonlinear absorption," IEEE J. Sel. Top. Quantum Electron. 2, 801-809 (1997)]. Because the excitation leading to laser induced damage (breakdown) occurs during the laser pulse, transitions with lifetimes longer that the pulse duration (in our case ~1 ns) will not have any effect on laser damage mechanisms. Consequently we consider only the transitions between the singlet states. The accordingly modified Jablonski energy diagram in FIG. 16 describes the electronic structure in LC materials involving a singlet ground state ($S_0$) and excited singlet ($S_1$, $S_2$, ... $S_n$) where the energy levels are defined as multiples of the energy of a 1053 nm photon used in this study. Transmission measurements for each material provided insight into which photon absorption order would be required to bridge the energy gap from $S_0 \rightarrow S_1$.

Figure 14:
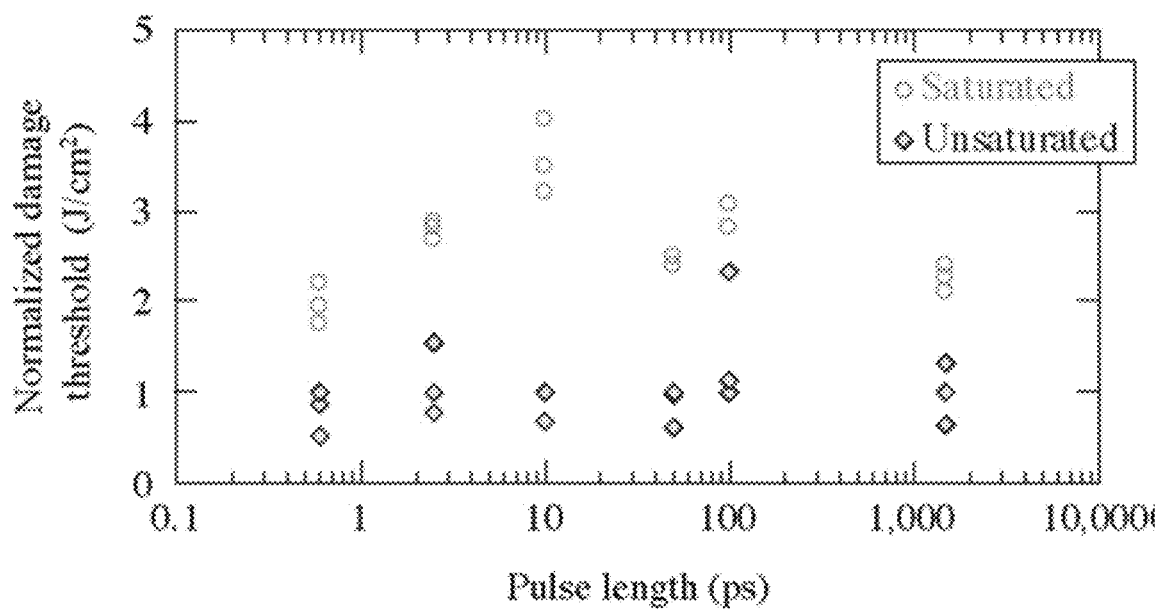
FIG. 14 charts the relative difference between N-on-1 LIDT's of saturated and unsaturated compounds as a function of pulse length. Data are normalized to results obtained for the unsaturated cyanobiphenyl LC mixture E7. At 10 ps there is a substantial increase in the difference between the LIDT of the two materials, which suggests a change in the mechanism for laser-induced damage.

The wavelengths designating the onset of linear absorption for each LC material given in Table 1 are used as a guide to suggest the order of photon absorption required for the $S_0 \rightarrow S_1$ electronic state transition for unsaturated and saturated materials. Under 1053-nm laser irradiation, the unsaturated materials require three-photon absorption for the $S_0 \rightarrow S_1$ transition, while the saturated materials require four-photon absorption. This difference in the order of the absorption process required to generate excited-state electrons is captured clearly by the difference in the damage threshold between the two types of materials, where the saturated materials have 2× to 3× higher damage threshold across all pulse lengths tested (FIGS. 12 and 14).

Figure 17:
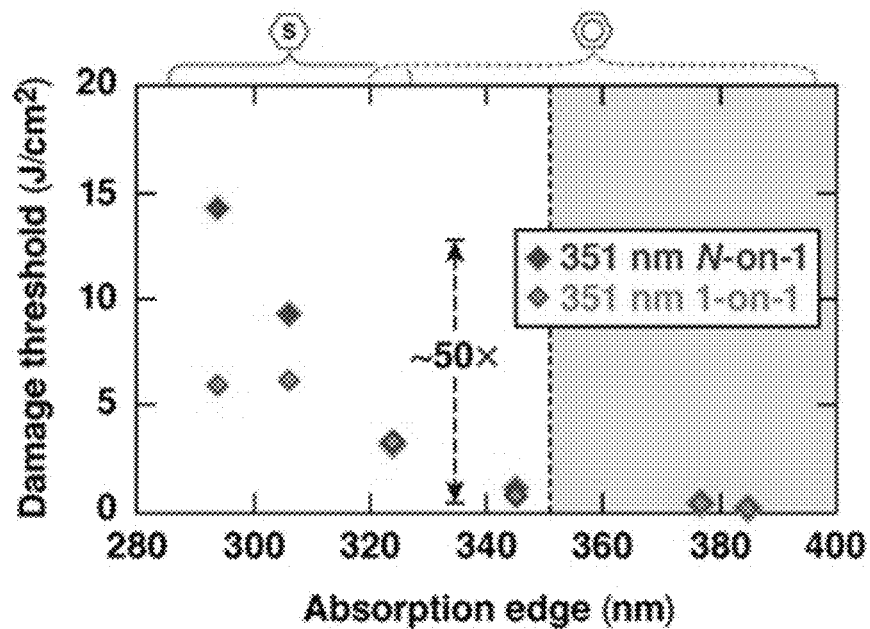
FIG. 17 charts LIDT and absorption edge for certain saturated and unsaturated LC materials.

The LIDT results shown in FIG. 17 indicate that the laser-induced-damage thresholds under irradiation with 351-nm and 1-ns pulses follow the absorption edge of the LC materials, a trend that is particularly clear for the N-on-1 results. This behavior may be assigned in part to the order of the excitation process. As depicted in the schematic representation of the energy structure of the saturated and unsaturated materials shown in FIG. 16 the highly unsaturated materials require 1-photon absorption for the $S_0 \rightarrow S_1$ transition while saturated materials require a 2-photon absorption process. This difference is potentially responsible for the large difference in the LIDT (~20×-50×, depending on damage testing method) between the saturated and unsaturated materials. The results also show laser conditioning (N-on-1 LIDT>1-on-1 LIDT) occurs in saturated materials.

Figure 18:
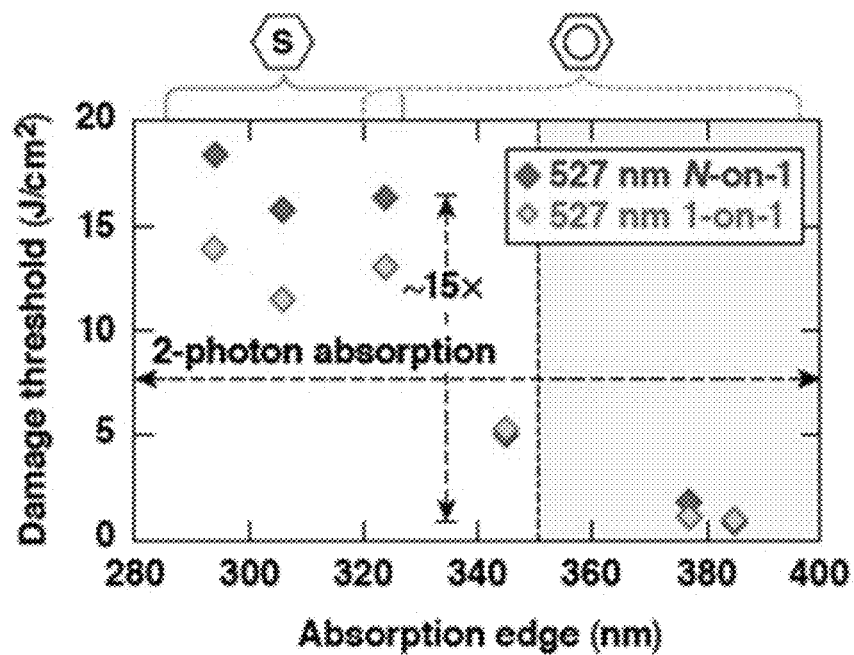
FIG. 18 charts LIDT results for saturated and unsaturated LC materials irradiated with 527-nm and 1.2-ns pulses.

The LIDT results under irradiation with 527-nm and 1.2-ns pulses are shown in FIG. 18. Based on the absorption characteristics of all materials, both unsaturated and saturated materials require 2-photon absorption to populate the first excited state. Therefore, the strong dependence of LIDT on material saturation (~10-15× difference) cannot be assigned to the $S_0 \rightarrow S_1$ transition cross sections. It is possible that this behavior arises from differences in the absorption cross section for transition between excited states $S_1 \rightarrow S_2$. Specifically, it is possible that the saturated materials require 2-photon absorption for the $S_1 \rightarrow S_2$ transition, while unsaturated materials need only 1-photon absorption. This difference in the electronic excitation process is depicted in the schematic representation of the electronic energy level diagram shown in FIG. 16. Previous studies of the excited state absorption spectrum in different LC materials revealed that the energy separation between the first two excited states can be either higher or lower than the 527 nm photon energy, depending on the material [See (1) R. Sander, V. Herrmann, and R. Menzel, "Transient absorption spectra and bleaching of 4'-n-pentyl-4-cyanoterphenyl in cyclohexane—determination of cross sections and recovery times," J. Chem. Phys. 104, 4390-4395 (1996); and (2) G. E. O'Keefe, J. C. De Mello, G. J. Denton, K. J. McEwan, and S. J. Till, "Transient excited-state absorption of the liquid crystal CB15 [4-(2-methylbutyl)-4-cyanobiphenyl] in its isotropic phase," Liq. Cryst. 21, 225-232 (1996)]. Significant laser conditioning is once again observed in the saturated materials.

The LIDT results under irradiation with 1053-nm, 1.5-ns pulses were shown previously in FIG. 12(a). The difference in the LIDT between saturated and unsaturated materials can be assigned to the change in the order of the excitation process for the $S_0 \rightarrow S_1$ transition (3-photon vs 4-photon absorption, respectively). This difference in the order of the absorption process required to generate excited-state electrons is clearly captured by the difference in the LIDT between the two types of materials. Although the difference in LIDT at 1053 nm between saturated and unsaturated materials is 2× to 3× higher across all pulse lengths tested, these values are relatively small compared to the difference in LIDT between the two materials systems observed with 527 nm (~15×). and 351 nm pulses (~50×).

What Was Learned from This Study

The results demonstrate that the LIDT values exhibit a strong dependence on the incident laser wavelength, which indicates that damage initiation is sensitive to the energy separation between the ground and excited states. In order to deposit a sufficient amount of energy to initiate damage, electrons might be excited to a level $S_n \geq S_2$. Among all probable pathways for the $S_0 \rightarrow S_n$ transition, the one that involves the lowest order excitation processes (through existing intermediate states) is expected to be the dominant mechanism. In our system, this principle implies that the electrons will first undergo the $S_0 \rightarrow S_1$ transition, followed by the $S_1 \rightarrow S_2$ transition, and then followed by possible single photon transitions to reach higher excited states (due to smaller energy separations).

Upon excitation of electrons to the first excited state, additional excited-state absorption will require a lower-order absorption process, because the energy separation between $S_1$ and $S_n$ states is smaller compared to that between $S_0$ and $S_1$ states [See (1) R. Sander, V. Herrmann, and R. Menzel, "Transient absorption spectra and bleaching of 4'-n-pentyl-4-cyanoterphenyl in cyclohexane—determination of cross sections and recovery times," J. Chem. Phys. 104, 4390-4395 (1996); and (2) G. E. O'Keefe, J. C. De Mello, G. J. Denton, K. J. McEwan, and S. J. Till, "Transient excited-state absorption of the liquid crystal CB15 [4-(2-methylbutyl)-4-cyanobiphenyl] in its isotropic phase," Liq. Cryst. 21, 225-232 (1996)]. This smaller energy separation, in turn, yields a higher absorption cross section for excited-state absorption (ESA) and is therefore critical in the context of laser damage. Because the lifetime of the Si state is of the order of 1 ns or longer, in this work, the excited electrons do not return to the ground state during the laser pulse [See (1) R. Sander, V. Herrmann, and R. Menzel, "Transient absorption spectra and bleaching of 4'-n-pentyl-4-cyanoterphenyl in cyclohexane—determination of cross sections and recovery times," J. Chem. Phys. 104, 4390-4395 (1996); and (2) G. E. O'Keefe, J. C. De Mello, G. J. Denton, K. J. McEwan, and S. J. Till, "Transient excited-state absorption of the liquid crystal CB15 [4-(2-methylbutyl)-4-cyanobiphenyl] in its isotropic phase," Liq. Cryst. 21, 225-232 (1996)]. Consequently, ESA is a more effective energy-deposition mechanism, but is limited by the available excited-state electron population. Therefore, two general governing mechanisms that contribute to absorption of energy by the laser pulse can be considered: (a) direct absorption by ground-state electrons and (b) absorption by excited-state electrons involving only the singlet states. The excited-state electrons can, in principle, undergo multiple absorption cycles by either reaching the higher excited state ($S_2$) and returning to the Si state during the laser pulse to repeat the process or continuing with additional absorption toward higher excited states ($S_2 \rightarrow S_m$).

Laser-induced damage experiments exploring pulse length scaling provide insight into energy-deposition mechanisms. Of particular interest is the change in the normalized LIDT between the two types of materials at 10 ps (FIG. 14), which transitions from a two-fold to a three-fold increase before returning to initial values at longer pulse lengths. This change is also captured in FIG. 15 in the same pulse-length regime by the very different factors between LIDT at successive pulse lengths. The behavior observed in FIGS. 14 and 15 in the range from 3 to 50 ps likely arises from the complex interplay between energy-deposition mechanisms, as well as the temporal behavior of the ESA cross section. Specifically, O'Keefe showed that for CB15 (an unsaturated cyanobiphenyl identical in structure with 5CB except that it has a chiral alkyl terminal group instead of the straight-chain alkyl group found on 5CB) the ESA cross section can change rapidly within time scales of the order of 10 to 50 ps, which could directly impact the average efficiency (rate of energy deposition) of ESA as a function of the laser pulse length [See G. E. O'Keefe, J. C. De Mello, G. J. Denton, K. J. McEwan, and S. J. Till, "Transient excited-state absorption of the liquid crystal CB15 [4-(2-methylbutyl)-4-cyanobiphenyl] in its isotropic phase," Liq. Cryst. 21, 225-232 (1996)].

Figure 19:
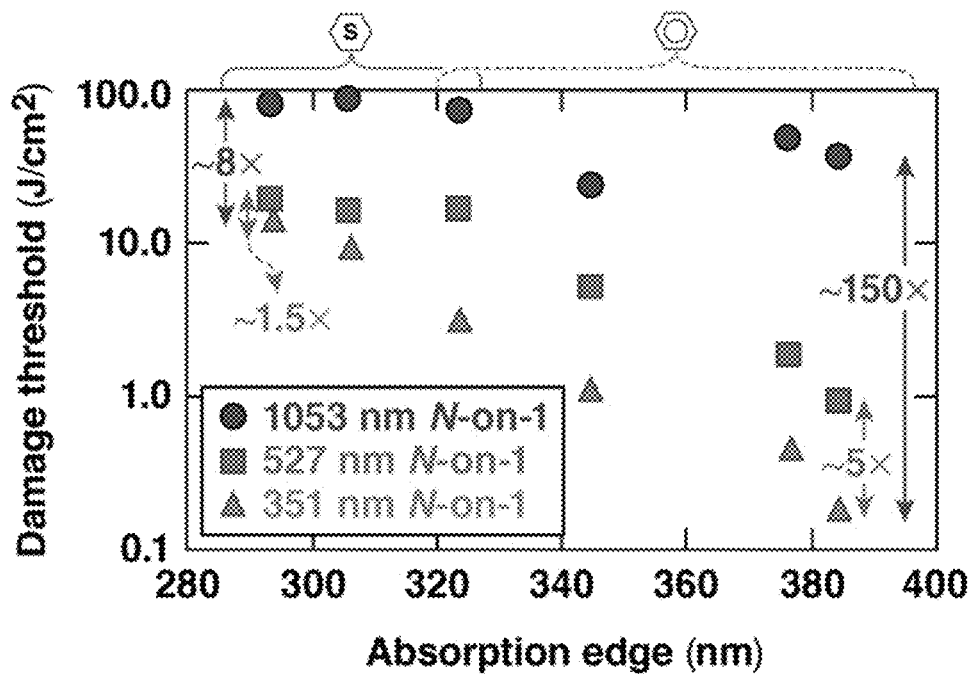
FIG. 19 charts the N-on-1 average LIDT values for nanosecond pulses at all three wavelengths as a function of each material's absorption edge, which enables direct comparison of the relative differences in LIDT arising from differences in the excitation process.

To better capture the relative difference in the measured LIDT at different wavelengths and their relationship to the electronic structure of each type of material (summarized in FIG. 12), the average N-on-1 LIDT results for both saturated and unsaturated materials at all wavelengths are shown in FIG. 19. Comparison of the 351-nm and 527-nm results shows a difference between LIDT values of ~5× for unsaturated materials and only of ~1.5× for saturated materials. This behavior can be anticipated from the type of absorption order required for electrons to undergo the $S_0 \rightarrow S_1$ transition. Specifically, unsaturated materials require both linear absorption at 351 nm and 2-photon absorption at 527 nm, while for saturated materials, 2-photon absorption is necessary to populate the first excited state at both wavelengths. This key difference in the electronic excitation process is reflected in the corresponding difference in the LIDT values.

Comparing LIDT results obtained under 351-nm and 1053-nm excitation, the difference in LIDT for unsaturated materials is ~150× but only ~8× for saturated materials. The dramatic variation in LIDT differences for the two material types is arguably related to the different order of the absorption process required for the $S_0 \rightarrow S_1$ transition. The order changes from linear absorption to a 3-photon absorption process in unsaturated materials, while for saturated materials a nonlinear process is required at both wavelengths (2-photon and 4-photon processes for 351-nm and 1053-nm excitation, respectively).

Laser conditioning (N-on-1 LIDT>1-on-1 LIDT) was only observed under a subset of conditions: (a) both material types at 50 ps, 100 ps, and 1.5 ns at 1053 nm and (b) saturated materials at 527 nm and 351 nm. The LIDT results for unsaturated LC's (5CB, E7 and the PPMeOB/PPPOB mixture) and saturated LC's (1550C, MLC-2037, and the partially saturated ZLI-1646) were averaged at each wavelength and plotted as a function of the pulse length in FIG. 20. The subset of data associated with laser conditioning is noted.

Figure 20:
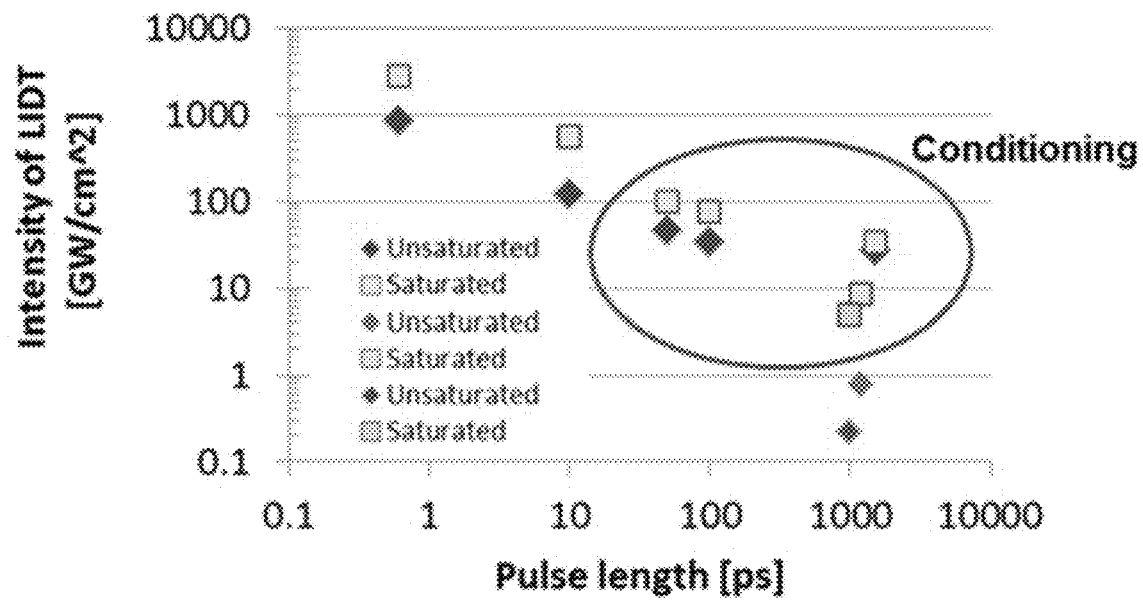
FIG. 20 charts the average damage intensity for saturated and unsaturated materials for each tested pulse length and wavelength condition. The mechanism for laser conditioning appears to have a minimum intensity of ~5 $GW/cm^2$. The data also show a lower bound for the time scale (<50 ps) during which laser conditioning cannot take place.

The highlighted data associated with observations of laser conditioning shown in FIG. 20 are found in the upper right quadrant with intensities higher than ~5 GW/cm$^2$ and pulse duration longer than 10 ps. This observation may suggest that a threshold intensity exists for laser conditioning. Unsaturated compounds have LIDT values lower that this conditioning threshold intensity (<5 GW/cm$^2$) at both 351 nm and 527 nm. Results also suggest that laser conditioning is limited to time scales greater than 10 ps. There are two scenarios for this limitation. In one case, conditioning involves a two-step process with a characteristic rise time (on the order of 10 ps) associated with promotion of electrons to an excited state, followed by transition to an intermediate state where further excitation can facilitate conditioning. In the second case, the laser conditioning mechanism is dictated by the time scale of photochemically-induced reaction kinetics (e.g. volatilization of impurities or photochemically-induced reaction of the LC molecules with intrinsic or extrinsic impurities, breakdown products, or with each other to form more stable compounds (eg. oxygen bridge formation in biphenyls).

In summary, this study demonstrate that the LIDT values show strong dependence on wavelength and electronic structure, which in turn provides information about the excitation pathways leading to laser induced damage. Experimental data suggest that key components in the laser-induced damage mechanisms in LC's involve a complex interplay of both multiphoton absorption and excited-state absorption, where their relative contributions vary with both pulse length and wavelength. In general, saturated materials are shown to provide a higher LIDT at all wavelengths and pulse lengths.

The invention claimed is:

1. A beam shaping system, comprising:
    (a) a liquid crystal beam shaper, the beam shaper comprising liquid crystals and a photoswitchable alignment layer, the photoswitchable alignment layer comprising at least one material from the group of PESI-F, SPMA:MMA 1:5, SPMA:MMA 1:9, or SOMA:SOMA-p:MMA 1:1:6; and
    (b) an optical writing and erasing sub-system configured to write, erase, and rewrite a plurality of optical patterns in the photoswitchable alignment layer;
    wherein PESI-F is a poly(esterimide) comprising the repeat unit:

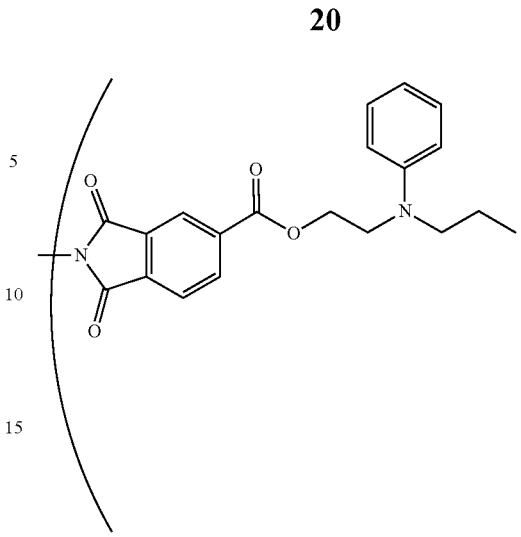

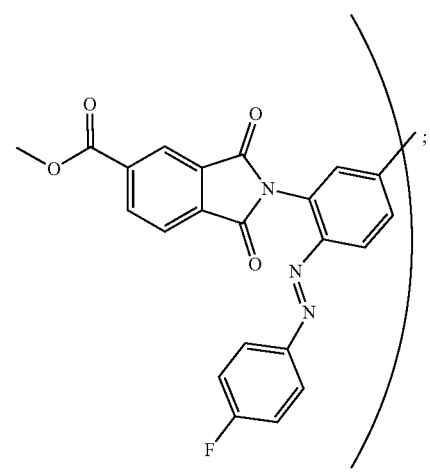

wherein SPMA:MMA 1:5 and SPMA:MMA 1:9 are copolymers comprising the repeat unit:

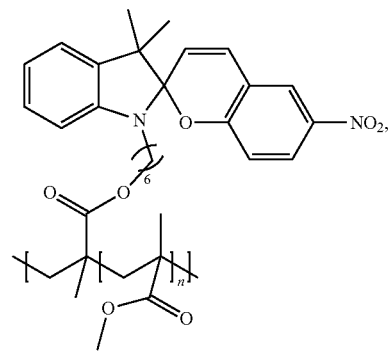

wherein n is 5 or 9, respectively;
wherein SOMA:SOMA-p:MMA 1:1:6 is a copolymer comprising the repeat unit:

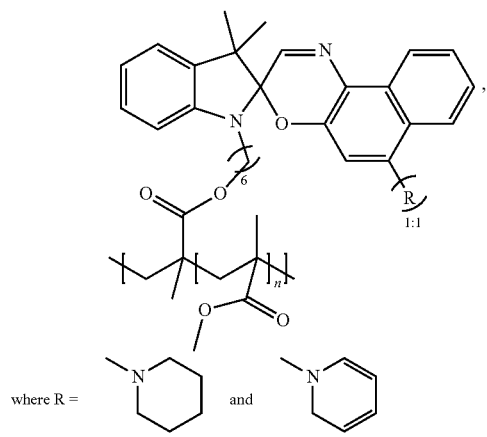

where R = [piperidine] and [pyridine]

wherein n is 6.

2. The beam shaping system of claim 1, wherein the photoswitchable alignment layer possesses an N-on-1 laser induced damage threshold of 80-100 J/cm$^2$ at 1053 nm.

3. The beam shaping system of claim 1, wherein at least some liquid crystals of the beam shaper comprise at least one of partially saturated liquid crystals, fully saturated liquid crystals, partially fluorinated liquid crystals, or perfluorinated liquid crystals.

4. The beam shaping system of claim 1, wherein at least some liquid crystals of the beam shaper comprise at least one of a phenylcyclohexane, a perfluorinated material, or saturated cyclohexane rings.

5. The beam shaping system of claim 1, wherein the liquid crystal beam shaper comprises an all-optical liquid crystal beam shaper.

6. The beam shaping system of claim 5, wherein the liquid crystal beam shaper comprises:
(i) a first transparent glass substrate comprising a first coating on an inner surface of the substrate, the first coating comprising the photoswitchable alignment layer;
(ii) a second transparent glass substrate comprising a second alignment coating on an inner surface of the substrate, the second alignment coating comprising either a buffed alignment layer or a layer that has been permanently oriented using polarized UV light;
(iii) the liquid crystals of the beam shaper located between the first and second substrates; and
(iv) a polarizer.

7. The beam shaping system of claim 6, wherein the beam shaping system is configured such that writing an optical pattern into the photoswitchable alignment layer causes a localized change in configuration of the liquid crystals, such that a laser beam passing through the liquid crystal beam shaper undergoes a localized change in polarization state.

8. The beam shaping system of claim 7, wherein the polarizer is configured to pass or reject portions of the laser beam depending on the localized change in polarization state.

9. The beam shaping system of claim 6, wherein the first and second transparent glass substrates comprise fused silica.

10. The beam shaping system of claim 9, wherein the second alignment coating comprises an alignment coating having a fixed alignment state.

11. The beam shaping system of claim 10, wherein the second alignment coating comprises at least one of a poly (N,N'-hexamethyleneadipinediamide), a cinnamate photopolymer, a coumarin-based photoalignment layer material, or an azobenzene photoswitchable alignment layer.

12. The beam shaping system of claim 6, wherein the optical writing and erasing sub-system comprises:
(i) a UV light source and a spatial light modulator configured to write an optical pattern in the photoswitchable alignment layer; or
(ii) a raster-scanned UV laser source configured to write the optical pattern in the photoswitchable alignment layer.

13. The beam shaping system of claim 12, wherein the optical writing and erasing sub-system is configured to erase the written optical pattern by application of UV light having a different polarization than the UV light used to write the optical pattern, or by application of visible light.

14. A beam shaping system, comprising:
(a) a liquid crystal beam shaper, the beam shaper comprising liquid crystals and a photoswitchable polymer command surface; and
(b) an optical writing and erasing sub-system;
the photoswitchable polymer command surface and the optical writing and erasing sub-system configured to write, erase, and rewrite a plurality of optical patterns in the photoswitchable alignment layer;
wherein at least one of the components in a beam path of the liquid crystal beam shaper have an N-on-1 laser induced damage threshold using a small beam damage testing configuration exceeding:
(i) 40 J/cm$^2$ at 1053 nm and 1500 ps pulse width; or
(ii) 5 J/cm$^2$ at 1053 nm and 100 ps pulse width; or
(iii) 1 J/cm$^2$ at 1053 nm and 10 ps pulse width; or
(iv) 0.8 J/cm$^2$ at 1053 nm and 0.6 ps pulse width.

15. The beam shaping system of claim 14, wherein at least some liquid crystals of the beam shaper comprise at least one of partially saturated liquid crystals, fully saturated liquid crystals, partially fluorinated liquid crystals, or perfluorinated liquid crystals.

16. The beam shaping system of claim 15, wherein the liquid crystal beam shaper comprises an all-optical liquid crystal beam shaper.

17. A beam shaping system, comprising:
(a) an all-optical liquid crystal beam shaper, the beam shaper comprising:
(i) a first transparent glass substrate comprising a first coating on an inner surface of the substrate, the first coating comprising a photoswitchable alignment material comprising at least one of a SPMA:MMA 1:5, SPMA:MMA 1:9, or a SOMA:SOMA-p:MMA 1:1:6 material;
(ii) a second transparent glass substrate comprising a fixed alignment coating on an inner surface of the substrate;
(iii) liquid crystals between the first and second glass substrates, wherein at least some liquid crystals of the beam shaper comprise at least one of a phenyl-cyclohexane, a perfluorinated material, or saturated cyclohexane rings; and
(iv) a polarizer; and
(b) an optical writing and erasing sub-system configured to write, erase, and rewrite a plurality of optical patterns in the first coating;
wherein SPMA:MMA 1:5 and SPMA:MMA 1:9 are copolymers comprising the repeat unit:

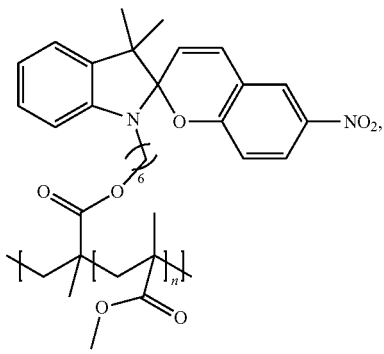

wherein n is 5 or 9, respectively;
wherein SOMA:SOMA-p:MMA 1:1:6 is a copolymer comprising the repeat unit:

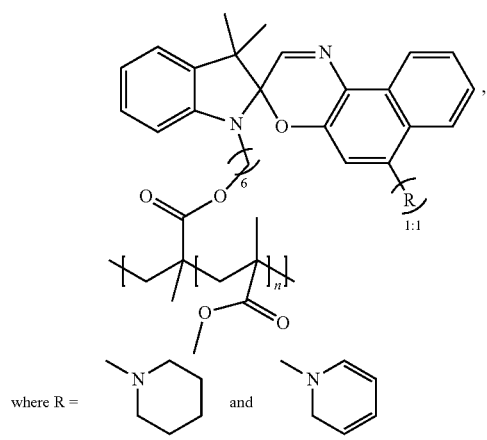

wherein n is 6.

18. The beam shaping system of claim 17, wherein the beam shaping system is configured such that writing an optical pattern into the first coating causes a localized change in configuration of the liquid crystals, such that a laser beam passing through the liquid crystal beam shaper undergoes a localized change in polarization state.

19. The beam shaping system of claim 18, wherein the polarizer is configured to pass or reject portions of the laser beam depending on the localized change in polarization state.

20. The beam shaping system of claim 17, wherein the optical writing and erasing sub-system comprises:
(i) a UV light source and a spatial light modulator configured to write an optical pattern in the first coating; or (ii) a raster-scanned UV laser source configured to write the optical pattern in the first coating.

21. The beam shaping system of claim 1, wherein at least one of the components in a beam path of the liquid crystal beam shaper have an N-on-1 laser induced damage threshold using small beam damage testing configuration exceeding:
(i) 40 J/cm$^2$ at 1053 nm and 1500 ps pulse width; or
(ii) 5 J/cm$^2$ at 1053 nm and 100 ps pulse width; or
(iii) 1 J/cm$^2$ at 1053 nm and 10 ps pulse width; or
(iv) 0.8 J/cm$^2$ at 1053 nm and 0.6 ps pulse width.

22. The beam shaping system of claim 17, wherein the beam shaping system is configured to shape a laser beam of a laser additive manufacturing system.

23. A laser additive manufacturing system, comprising:
(a) a laser beam source configured to generate a laser beam for additive manufacturing; and
(b) a beam shaping system configured to repeatedly vary a profile of the laser beam, the beam shaping system comprising:
(i) an all-optical, optically addressable beam shaper, comprising liquid crystals and a photoswitchable alignment layer; and
(ii) an optical writing and erasing sub-system configured to repeatedly write and erase a plurality of optical patterns in the photoswitchable alignment layer to cause a localized change in alignment of the liquid crystals.

24. The additive manufacturing system of claim 23, wherein the liquid crystals comprise at least one of partially saturated liquid crystals, fully saturated liquid crystals, partially fluorinated liquid crystals, or per-fluorinated liquid crystals.

25. The additive manufacturing system of claim 23, wherein the liquid crystals comprise at least one of a phenylcyclohexane, a per-fluorinated material, or saturated cyclohexane rings.

26. The additive manufacturing system of claim 24, wherein the beam shaper comprises:
(i) a first transparent glass substrate and a first coating on an inner surface of the substrate, the first coating comprising the photoswitchable alignment layer;
(ii) a second transparent glass substrate and a second alignment coating on an inner surface of the substrate, the second alignment coating having a fixed alignment state;
(iii) the liquid crystals of the beam shaper located between the two alignment layers and substrates; and
(iv) a polarizer configured to reflect a first polarization state and transmit a second polarization state that is complimentary of the first polarization state.

27. The additive manufacturing system of claim 26, wherein the first and second coatings are electrically non-conductive.

28. The additive manufacturing system of claim 23, wherein the liquid crystals comprise an absorption edge of less than 330 nm.

29. The additive manufacturing system of claim 28, wherein the photoswitchable alignment layer comprises at least one of a PESI-F, SPMA:MMA 1:5, SPMA:MMA 1:9, or a SOMA:SOMA-p:MMA 1:1:6 material;
wherein PESI-F is a poly(esterimide) comprising the repeat unit:

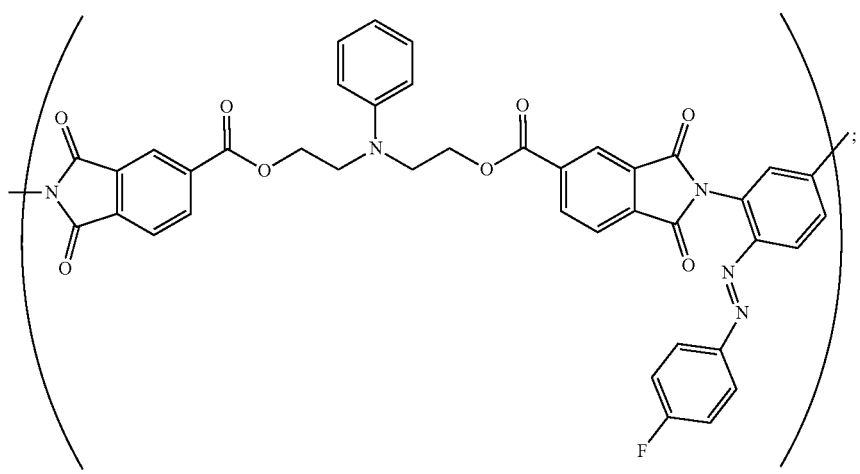

wherein SPMA:MMA 1:5 and SPMA:MMA 1:9 are copolymers comprising the repeat unit:

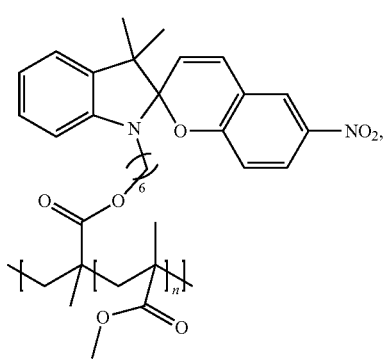

wherein n is 5 or 9, respectively;

wherein SOMA:SOMA-p:MMA 1:1:6 is a copolymer comprising the repeat unit:

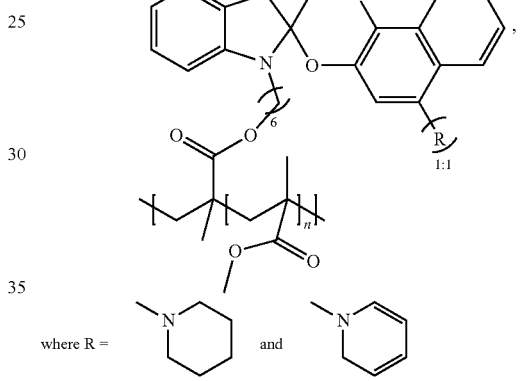

wherein n is 6.

30. The additive manufacturing system of claim 23, wherein at least one of the components in a beam path of the beam shaper have an N-on-1 laser induced damage threshold using small beam damage testing configuration exceeding:
(i) 40 J/cm$^2$ at 1053 nm and 1500 ps pulse width; or
(ii) 5 J/cm$^2$ at 1053 nm and 100 ps pulse width; or
(iii) 1 J/cm$^2$ at 1053 nm and 10 ps pulse width; or
(iv) 0.8 J/cm$^2$ at 1053 nm and 0.6 ps pulse width.

* * * * *